United States Patent
Chatterjee

(10) Patent No.: US 8,954,001 B2
(45) Date of Patent: *Feb. 10, 2015

(54) POWER BRIDGE CIRCUIT FOR BI-DIRECTIONAL WIRELESS POWER TRANSMISSION

(75) Inventor: Manjirnath Chatterjee, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1402 days.

This patent is subject to a terminal disclaimer.

(21) Appl. No.: 12/628,401

(22) Filed: Dec. 1, 2009

(65) Prior Publication Data

US 2011/0018356 A1    Jan. 27, 2011

Related U.S. Application Data

(60) Provisional application No. 61/227,423, filed on Jul. 21, 2009.

(51) Int. Cl.
*H04B 5/00* (2006.01)
*H02J 5/00* (2006.01)

(52) U.S. Cl.
CPC .................... *H02J 5/005* (2013.01)
USPC ........ 455/41.1; 455/41.2; 455/41.3; 336/130; 336/131; 381/79; 307/104

(58) Field of Classification Search
USPC .......................... 455/1, 3.03, 41.1, 41.2, 41.3; 336/130–134; 381/79; 307/104
See application file for complete search history.

(56) References Cited

U.S. PATENT DOCUMENTS

| | | |
|---|---|---|
| 5,375,226 A | 12/1994 | Sano et al. |
| 5,455,466 A | 10/1995 | Parks et al. |
| 5,596,567 A | 1/1997 | de Muro et al. |
| 5,600,225 A | 2/1997 | Goto |
| 5,666,530 A | 9/1997 | Clark et al. |
| 5,733,313 A | 3/1998 | Barreras et al. |
| 5,760,580 A | 6/1998 | Tyren |
| 5,831,348 A | 11/1998 | Nishizawa |
| 5,958,051 A | 9/1999 | Renaud et al. |
| 6,006,274 A | 12/1999 | Hawkins et al. |
| 6,138,245 A | 10/2000 | Son et al. |
| 6,184,651 B1 | 2/2001 | Fernandez et al. |
| 6,266,539 B1 | 7/2001 | Pardo |

(Continued)

FOREIGN PATENT DOCUMENTS

| | | |
|---|---|---|
| CN | 1592197 A | 3/2005 |
| CN | 101461125 A | 6/2009 |

(Continued)

OTHER PUBLICATIONS

U.S. Appl. No. 11/430,786, filed May 8, 2006, Baraban et al.

(Continued)

*Primary Examiner* — Tuan H Nguyen
(74) *Attorney, Agent, or Firm* — Mahamedi Paradice LLP

(57) ABSTRACT

An inductive signal interface includes a coil assembly which has one or more inductive coils. The inductive signal interface also has a bridge circuit that couples to the coil assembly to a power input/output (I/O). The bridge circuit has components that operate to enable the inductive signal interface to selectively operate in either a power transmit mode or a power receive mode.

20 Claims, 17 Drawing Sheets

(56) References Cited

U.S. PATENT DOCUMENTS

| | | |
|---|---|---|
| 6,330,436 B1 | 12/2001 | Zidel |
| 6,389,423 B1 | 5/2002 | Sakakura |
| 6,400,274 B1 | 6/2002 | Duan et al. |
| 6,405,049 B2 | 6/2002 | Herrod et al. |
| 6,436,299 B1 | 8/2002 | Baarman et al. |
| 6,445,936 B1 | 9/2002 | Cannon et al. |
| 6,501,364 B1 | 12/2002 | Hui et al. |
| 6,510,424 B1 | 1/2003 | Ford et al. |
| 6,515,878 B1 | 2/2003 | Meins et al. |
| 6,532,152 B1 | 3/2003 | White et al. |
| 6,673,250 B2 | 1/2004 | Kuennen et al. |
| 6,731,071 B2 | 5/2004 | Baarman |
| 6,795,110 B1 | 9/2004 | Kossin |
| 6,803,744 B1 | 10/2004 | Sabo |
| 6,806,649 B2 | 10/2004 | Mollema et al. |
| 6,810,405 B1 | 10/2004 | LaRue et al. |
| 6,812,645 B2 | 11/2004 | Baarman |
| 6,825,620 B2 | 11/2004 | Kuennen et al. |
| 6,831,417 B2 | 12/2004 | Baarman |
| 6,888,438 B2 | 5/2005 | Hui et al. |
| 6,917,163 B2 | 7/2005 | Baarman |
| 6,975,198 B2 | 12/2005 | Baarman et al. |
| 6,986,051 B2 | 1/2006 | Le Pennec et al. |
| 7,065,658 B1 | 6/2006 | Baraban et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,132,918 B2 | 11/2006 | Baarman et al. |
| 7,149,473 B1 | 12/2006 | Lindlar et al. |
| 7,164,255 B2 | 1/2007 | Hui |
| 7,248,017 B2 | 7/2007 | Cheng et al. |
| 7,262,700 B2 | 8/2007 | Hsu |
| 7,271,569 B2 | 9/2007 | Oglesbee |
| 7,286,880 B2 | 10/2007 | Olson et al. |
| 7,323,964 B1 * | 1/2008 | Shyu et al. .................. 336/131 |
| 7,331,793 B2 | 2/2008 | Hernandez et al. |
| 7,352,567 B2 * | 4/2008 | Hotelling et al. ........ 361/679.55 |
| 7,375,492 B2 | 5/2008 | Calhoon et al. |
| 7,382,636 B2 | 6/2008 | Baarman et al. |
| 7,385,357 B2 | 6/2008 | Kuennen et al. |
| 7,392,059 B2 | 6/2008 | White et al. |
| 7,414,380 B2 | 8/2008 | Tang et al. |
| 7,446,672 B2 | 11/2008 | Johnson et al. |
| 7,454,170 B2 | 11/2008 | Goossens et al. |
| 7,462,951 B1 | 12/2008 | Baarman |
| 7,471,986 B2 | 12/2008 | Hatlestad |
| 7,495,414 B2 | 2/2009 | Hui |
| 7,518,267 B2 | 4/2009 | Baarman |
| 7,521,890 B2 | 4/2009 | Lee et al. |
| 7,576,514 B2 | 8/2009 | Hui |
| 7,627,343 B2 * | 12/2009 | Fadell et al. .................. 455/557 |
| 7,743,151 B2 | 6/2010 | Vallapureddy et al. |
| 8,278,784 B2 | 10/2012 | Cook et al. |
| 8,487,481 B2 | 7/2013 | Cook et al. |
| 2002/0084698 A1 | 7/2002 | Kelly et al. |
| 2002/0103008 A1 | 8/2002 | Rahn et al. |
| 2003/0214255 A1 | 11/2003 | Baarman et al. |
| 2003/0233455 A1 | 12/2003 | Leber et al. |
| 2004/0088012 A1 | 5/2004 | Kroll et al. |
| 2004/0130915 A1 | 7/2004 | Baarman |
| 2004/0130916 A1 | 7/2004 | Baarman |
| 2004/0150934 A1 | 8/2004 | Baarman |
| 2004/0222751 A1 | 11/2004 | Mollema et al. |
| 2004/0232845 A1 | 11/2004 | Baarman et al. |
| 2004/0259499 A1 | 12/2004 | Oba et al. |
| 2004/0266362 A1 | 12/2004 | Watkins et al. |
| 2005/0007067 A1 | 1/2005 | Baarman et al. |
| 2005/0093475 A1 | 5/2005 | Kuennen et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2006/0041420 A1 | 2/2006 | Martin et al. |
| 2006/0061958 A1 | 3/2006 | Solomon et al. |
| 2006/0123055 A1 | 6/2006 | Atkinson et al. |
| 2006/0132045 A1 | 6/2006 | Baarman |
| 2006/0187049 A1 | 8/2006 | Moser et al. |
| 2007/0035917 A1 | 2/2007 | Hotelling et al. |
| 2007/0064406 A1 | 3/2007 | Beart |
| 2007/0120752 A1 | 5/2007 | Takasu |
| 2007/0182367 A1 | 8/2007 | Partovi |
| 2007/0188284 A1 | 8/2007 | Dobbs |
| 2007/0246546 A1 | 10/2007 | Yoshida |
| 2007/0290654 A1 | 12/2007 | Govari et al. |
| 2008/0133918 A1 | 6/2008 | Yong-kuk et al. |
| 2008/0196086 A1 | 8/2008 | Shintani et al. |
| 2008/0231537 A1 | 9/2008 | Rofougaran et al. |
| 2008/0278894 A1 | 11/2008 | Dongmin et al. |
| 2009/0001932 A1 | 1/2009 | Kamijo et al. |
| 2009/0001941 A1 | 1/2009 | Hsu et al. |
| 2009/0008148 A1 | 1/2009 | Mashino |
| 2009/0069869 A1 | 3/2009 | Stouffer et al. |
| 2009/0088077 A1 | 4/2009 | Brown et al. |
| 2009/0106567 A1 | 4/2009 | Baarman |
| 2009/0170433 A1 | 7/2009 | Rhodes et al. |
| 2009/0212637 A1 | 8/2009 | Baarman et al. |
| 2009/0212737 A1 | 8/2009 | Johnson et al. |
| 2009/0251938 A1 | 10/2009 | Hallak |
| 2010/0007449 A1 | 1/2010 | Tait et al. |
| 2010/0021176 A1 | 1/2010 | Holcombe et al. |
| 2010/0045269 A1 | 2/2010 | LaFranchise et al. |
| 2010/0070219 A1 | 3/2010 | Azancot et al. |
| 2010/0076524 A1 | 3/2010 | Forsberg et al. |
| 2010/0081377 A1 | 4/2010 | Corbridge et al. |
| 2010/0081473 A1 | 4/2010 | Chatterjee et al. |
| 2010/0081483 A1 | 4/2010 | Chatterjee et al. |
| 2010/0083012 A1 | 4/2010 | Corbridge et al. |
| 2010/0121965 A1 | 5/2010 | Chatterjee |
| 2010/0131691 A1 | 5/2010 | Chatterjee et al. |
| 2010/0146308 A1 | 6/2010 | Gioscia et al. |
| 2010/0148723 A1 | 6/2010 | Cook et al. |
| 2010/0156193 A1 | 6/2010 | Rhodes et al. |
| 2010/0172090 A1 | 7/2010 | Chatterjee |
| 2010/0177476 A1 | 7/2010 | Hotelling et al. |
| 2010/0194336 A1 | 8/2010 | Azancot et al. |
| 2011/0106954 A1 | 5/2011 | Chatterjee et al. |
| 2012/0042087 A1 | 2/2012 | Berg et al. |

FOREIGN PATENT DOCUMENTS

| | | |
|---|---|---|
| EP | 395469 A2 | 10/1990 |
| FR | 2601161 A1 | 1/1988 |
| GB | 2389720 B | 9/2005 |
| GB | 2399466 B | 11/2005 |
| GB | 2389767 B | 4/2006 |
| JP | 09-259241 A | 10/1997 |
| JP | 11-354348 A | 12/1999 |
| JP | 3161388 B2 | 2/2001 |
| KR | 10-0836634 B1 | 6/2008 |
| TW | 200824215 A | 6/2008 |
| WO | WO 95/03686 A1 | 2/1995 |
| WO | WO 2005/024865 A2 | 3/1995 |
| WO | WO 2004/098079 A1 | 11/2004 |
| WO | WO-2007034421 A2 | 3/2007 |
| WO | WO-2007141078 A1 | 12/2007 |
| WO | WO 2008/033670 A2 | 3/2008 |
| WO | WO 2008/044875 A1 | 4/2008 |
| WO | WO 2008/133806 A1 | 11/2008 |
| WO | WO 2009/057771 A1 | 5/2009 |
| WO | WO 2010/005324 A1 | 1/2010 |
| WO | WO 2010/062198 A1 | 6/2010 |
| WO | WO 2010/068062 A2 | 6/2010 |
| WO | WO 2010/068062 A3 | 7/2010 |
| WO | WO 2010/091269 A1 | 8/2010 |

OTHER PUBLICATIONS

U.S. Appl. No. 12/840,241, filed Jul. 20, 2010, Chatterjee.
U.S. Appl. No. 12/841,001, filed Jul. 21, 2010, Chatterjee.
U.S. Appl. No. 29/323,688, filed Aug. 28, 2008, Matsuoka.
Final Office Action mailed Oct. 25, 2004 in U.S. Appl. No. 09/861,658 10 pgs.
Final Office Action mailed Jul. 9, 2007 in U.S. Appl. No. 11/430,786.

(56) References Cited

OTHER PUBLICATIONS

Final Office Action mailed Jul. 19, 2010 in U.S. Appl. No. 11/430,786.
Final Office Action mailed Dec. 30, 2009 in U.S. Appl. No. 11/430,786.
Hui et al., "A New Generation of Universal Contactless Battery Charging Platform for Portable Consumer Electronic Equipment," IEEE Trans Power Electronics, 20(3):620-627 (2005).
International Search Report and Written Opinion dated Jul. 21, 2010 in International Application No. PCT/US2009/068328.
International Search Report and Written Opinion dated Jul. 28, 2010 in International Application No. PCT/US2009/068332.
International Search Report and Written Opinion dated Aug. 20, 2010 in International Application No. PCT/US2009/069847.
International Search Report and Writen Opinion dated Aug. 31, 2010 in International Application No. PCT/US2010/020054.
International Search Report and Written Opinion dated Apr. 20, 2010 in International Application No. PCT/US2009/055928.
Kean, Steven, "Powermat Portable Wireless Charging Mat", pp. 1-12 dwnloaded from http://www.bigbruin.com/content/powermat_1 on Sep. 29, 2010.
Liang et al., "An implantable bi-directional wireless transmission system for transcutaneous biological signal recording," Physiol. Meas. 26:83-97 (2005).
Mel, B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782.
Non-Final Office Action mailed Mar. 24, 2010 in U.S. Appl. No. 11/430,786.
Non-Final Office Action mailed Jul. 25, 2008 in U.S. Appl. No. 11/430,786.
Non-Final Office Action mailed Sep. 30, 2010 in U.S. Appl. No. 11/430,786 7 pgs.
Non-Final Office Action mailed Jan. 25, 2008 in U.S. Appl. No. 11/430,786.
Non-Final Office Action mailed Oct. 5, 2006 in U.S. Appl. No. 11/430,786.
Non-Final Office Action mailed Apr. 22, 2004 in U.S. Appl. No. 09/861,658 7 pgs.
Non-Final Office Action mailed Apr. 7, 2005 in U.S. Appl. No. 09/861,658 11 pgs.
Non-Final Office Action mailed Jun. 11, 2009 in U.S. Appl. No. 11/430,786.
Notice of Allowance mailed Jan. 9, 2006 in U.S. Appl. No. 09/861,658 12 pgs.
Opticon Users manual DWT 7133, Nov. 2000.
U.S. Appl. No. 16/916,338, filed Oct. 29, 2010, Chartterjee et al.
U.S. Appl. No. 12/975,335, filed Dec. 21, 2010, Oh et al.
U.S. Appl. No. 12/987,940, filed Jan. 10, 2011, Chatterjee et al.
Non-Final Office Action mailed Nov. 3, 2010 in U.S. Appl. No. 12/478,616 12 pgs.
International Search Report and Written Opinion dated Feb. 23, 2011 in International Application No. PCT/US2010/042779.

* cited by examiner

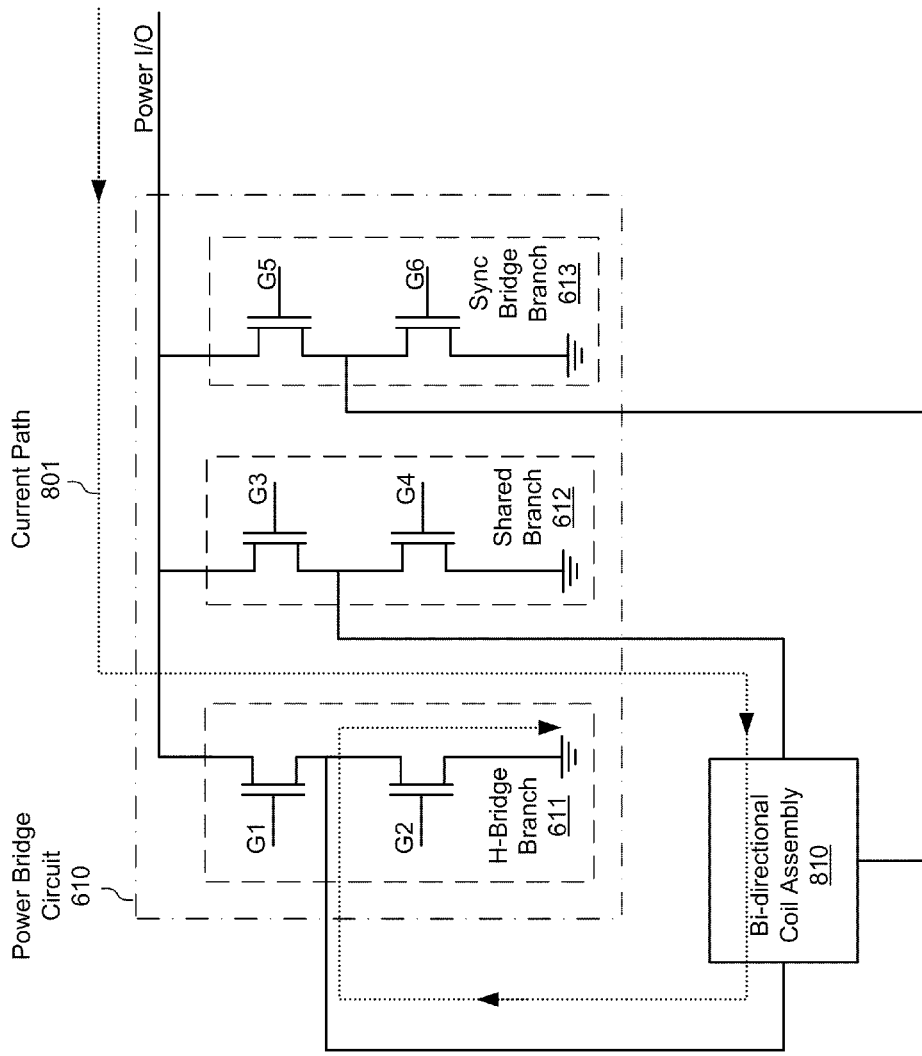

US 8,954,001 B2

POWER BRIDGE CIRCUIT FOR BI-DIRECTIONAL WIRELESS POWER TRANSMISSION

RELATED APPLICATIONS

This application claims priority to Provisional U.S. Patent Application No. 61/227,423, entitled WIRELESS POWER BRIDGE CIRCUIT, filed Jul. 21, 2009; the aforementioned application being hereby incorporated by reference.

TECHNICAL FIELD

The disclosed embodiments relate generally to the field of inductive signal interfaces. In particular, the disclosed embodiments relate to an inductive signal interface capable of bi-directional inductive signaling.

BACKGROUND

FIG. 1 illustrates an H-bridge inverter circuit 110 for transferring power from a DC supply 120 to an AC load 115. The H-bridge inverter circuit 110 includes four switches 111-114 each controlled by a respective one of control signals H1-H4. During the operation of the H-bridge inverter 110, the switches 111-114 turn on and off in pairs to deliver an AC current to the AC load 115. For example, at one instance, the signals H1 and H4 are asserted to turn on switches 111 and 114, while the signals H2 and H3 are de-asserted to turn off the switches 112 and 113. Current flows from DC power supply 120 through switch 111, to the AC load 115, through the switch 114, and to a ground voltage or a negative supply voltage. At another instance, the signals H1 and H4 are de-asserted to turn off switches 111 and 114, while the signals H2 and H3 are asserted to turn on the switches 112 and 113. During this instance, the current flows from the DC supply 120 through the switch 113, to the AC load 115, through the switch 112, and to the ground voltage or the negative supply voltage. By altering the direction of the current flow, the H-bridge inverter is configured to deliver an AC current from the DC supply 120 to the AC load 115.

FIG. 2 illustrates a sync bridge circuit 210 for transferring power from an AC supply 215 to a DC load 220. The sync bridge circuit 210 includes four switches 211-214 each controlled by a respective one of control signals S1-S4. The sync bridge circuit 210 receives an AC current from the AC supply 215, and the switches 211-214 of the sync bridge circuit 210 turn on and off in pairs to deliver a DC current to the DC load.

BRIEF DESCRIPTION OF THE DRAWINGS

The features and advantages of the present invention are illustrated by way of example and are by no means intended to limit the scope of the present invention to the particular embodiments shown, and in which:

FIG. 8A illustrates an operation of an embodiment of the power bridge circuit in the power transmit mode.

DETAILED DESCRIPTION

Embodiments described herein include an inductive signal interface that uses shared circuit elements to be operable as either a power transmitter or a power receiver. More specifically, an inductive signal interface includes a three-legged (or three-branched) structure that uses separate pairs of legs or branches to operate as an inductive power transmitter or an inductive power receiver.

An inductive signal interface includes a coil assembly which has one or more inductive coils. The inductive signal interface also has a bridge circuit that couples to the coil assembly to a power input/output (I/O). The bridge circuit has components that operate to enable the inductive signal interface to selectively operate in either a power transmit mode or a power receive mode.

The selective operation of the inductive signal interface may be determined: (i) in real-time based on, for example, an identification or mode of operation of the type of the other coupled device, and/or (ii) at a time of manufacturing based on the power consumption and/or transmission capabilities of the manufactured device.

In general, bridge circuits are circuits having at least two parallel current paths that form an enclosed loop. As used herein, a bridge circuit is a circuit that has multiple current branches that are individually operable to enable current to pass one direction or in a reverse direction.

Still further, another embodiment provides a computing system that includes a first and a second computing devices, each computing device including a similarly structured inductive signal interface. The inductive signal interface of each computing device includes a coil assembly which has one or more inductive coils and a bridge circuit that couples to the coil assembly to a power input/output (I/O). Each bridge circuit has components that operate to enable the respective inductive signal interface to selectively operate in either a power transmit mode or a power receive mode.

Figure 1:
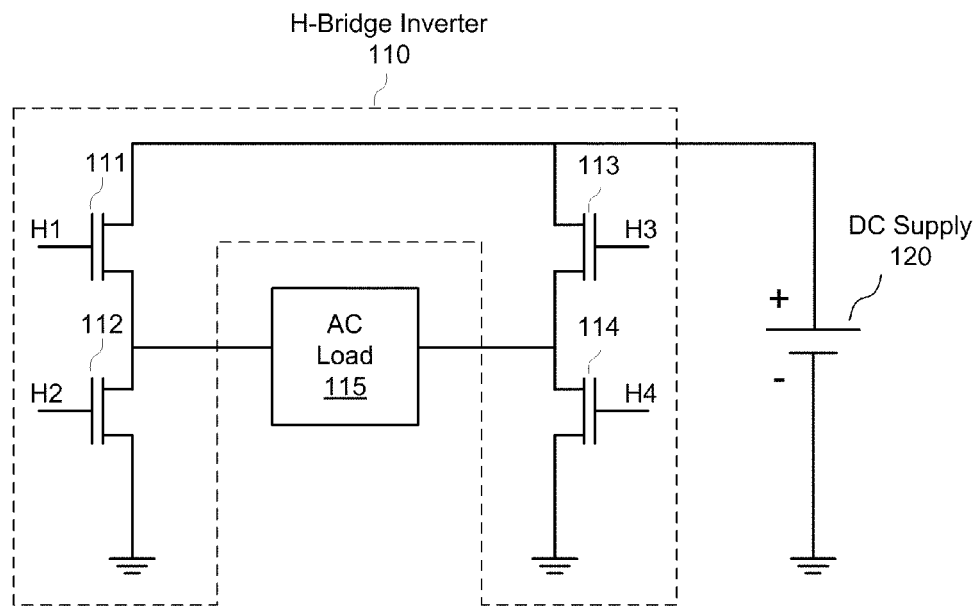
FIG. 1 illustrates a prior art H-bridge inverter circuit for delivering power from a DC power supply to an AC load.
Figure 2:
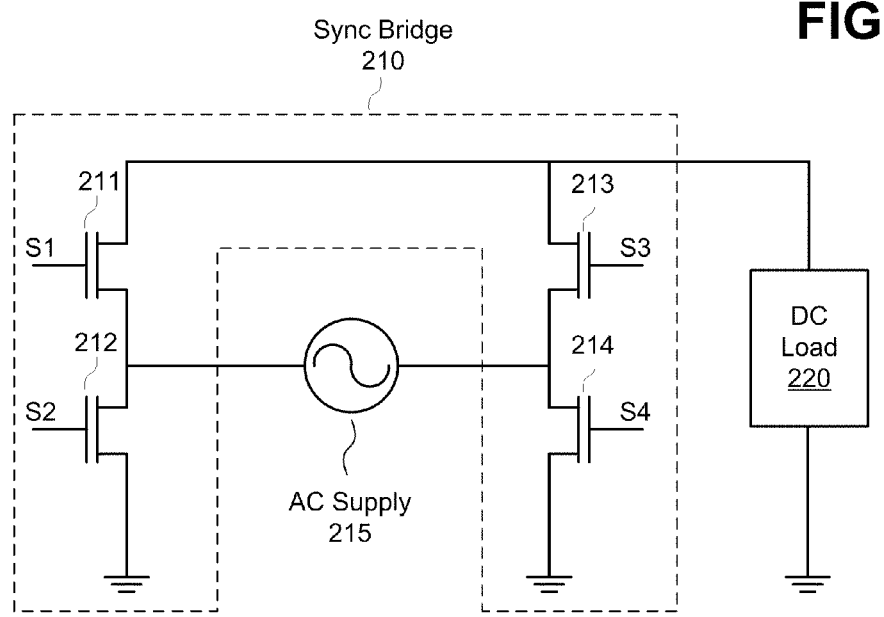
FIG. 2 illustrates a prior art synchronous bridge rectifier circuit for delivering power from an AC power supply to a DC load.
Figure 3:
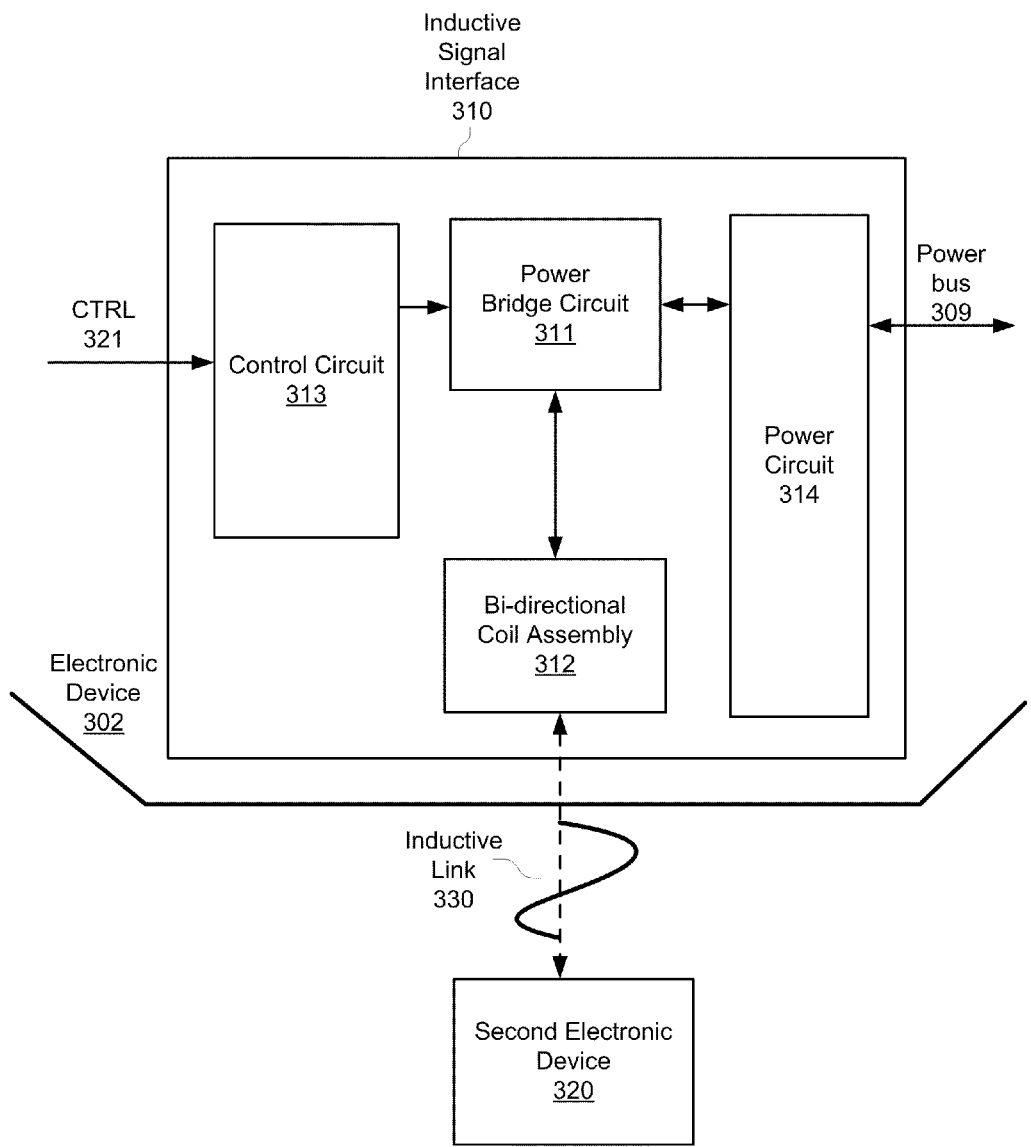
FIG. 3 is a block diagram illustrating an inductive signal interface, according to one or more embodiments.

FIG. 3 is a block diagram illustrating an embodiment of an inductive signal interface. According to an embodiment, an inductive signal interface 310 includes a power bridge circuit 311, a bi-directional coil assembly 312, a control circuit 313, and a power circuit 314. The inductive signal interface 310 may reside on any device that is capable of inductively receiving or transmitting power with another suitably configured device. Such devices are described in detail in U.S. patent application Ser. No. 12/478,766 entitled "Inductive Signal Transfer System for Computing Devices," (which is hereby incorporated by reference in its entirety). Accordingly, an inductive signal interface 310 may be integrated or incorporated into a mobile computing device (such as in a cellular telephony/messaging device), mobile computing device housing or housing accessory (e.g. housing panel for mobile computing device) or docking station. In one embodiment, the inductive signal interface 310 resides in a inductive charger for the mobile device. A device having inductive signal interface 310, may be referenced as an 'electronic device', and correspond to, for example, a mobile computing device or docking station. The inductive signal interface 310 is shown in FIG. 1 to be provided on a first electronic device 302, and used to create an inductive link 330 with a second electronic device 320. The second electronic device 320 may be any device capable of inductively receiving or transmitting signals. For example, in one implementation, the first electronic device corresponds to a docking station, and the second electronic device corresponds to a mobile computing device. In another implementation, both the first and second computing device may correspond to mobile computing devices. Other variations are similarly possible.

On the first electronic device 302, the combination of the bi-directional coil assembly 312 and the power bridge circuit 311 establish the inductive link 330 with the second electronic device 320. In one implementation, the first device 302 operates to transmit power to the second electronic device 320, in which case inductive signal interface 310 uses a power bus 309 and power circuits 314 to inductively transmit power to the second device 320. As mentioned below, the power bridge circuit 311 may be structured to handle a DC current that originates from a power source, such as a wall outlet (in which case rectifiers may be used to convert the AC signal to DC) or battery unit. In another implementation, the first device 302 operates to receive power over the inductive link 330. The same power bridge circuit 311 may be used for implementations in which first device 302 can only receive power over the inductive link 330. The ability to use the power bridge circuit 311 in either fashion may also enable the first device 302 to operate in both power receive and power transmit modes, depending on, for example, a type identification of the second electronic device 320. In such implementations, for example, a mobile computing device may (i) link with a dock to receive power, in which case the inductive signal interface operates in a power receiving mode; and (ii) link with another mobile computing device or headset that requires power, in which case the inductive signal interface operates in a power transmit mode.

In some embodiments, the mode of operation for the inductive signal interface 310 is set by control signals. The control signals may originate from (i) stored or hardwired parameters that designate the device as a power receiver or transmitter, or (ii) by identification of the second electronic device 320 in instances when the first electronic device 302 is ambidextrous. In implementations when the mode designation can be designated by control signals, the control signals 321 may be received or identified over a signal line CTRL (which may be coupled to receive information via the inductive link 330). As such, the signal line CTRL may identify the mode of operation of the inductive signal interface 310.

The power circuit 314 is coupled to the power bus 309 to handle current received in either mode (power receive or power transmit) of operation. The power circuit 314 may serve to clamp current levels, regulate voltage levels or perform other treatment functions for incoming (power transmit mode) and outgoing power signal (power receive mode). The power circuit 314 is coupled to the power bridge circuit 311 to (i) receive the power signal communicated over the inductive link 330, and/or (ii) transmit the power signal received from a power source (e.g. battery, wall outlet) of the first electronic device 302. The power circuit 314 includes one or more of: (i) voltage sensors, (ii) current sensors, (iii) voltage regulators, (iv) current regulators, or (v) current clamps to regulate the voltage and current of the DC power signal. In the power receive mode, the power circuit 314 outputs power received over the inductive link to another component that is on the first electronic device 302, or alternatively connected to the electronic device (e.g. rechargeable battery). In the power transmit mode, the power circuit 314 handles incoming power signal originating from a power source (e.g. wall adapter), the incoming power signal being used to transmit the power to the second electronic device 320 over the inductive link 330. In either the power receive or power transmit mode, one implementation provides the power circuit 314 to handle Direct Current power signals. Thus, in the power transmit mode, the power circuit 314 may handle a DC signal that was treated by other circuits to handle, for example, the alternating current signal from a wall outlet. In the power receive mode, the inductive link 330 handles the power signal in a modulated form, and this power signal is converted into DC for handling as output by the power circuit 314.

The power bridge circuit 311 is coupled to the power circuit 314 to (i) convert signals from DC to high-frequency form over inductive link 330 when the inductive signal interface 310 is in the power transmit mode, or (ii) from high-frequency form to DC when the inductive signal interface 310 is in the power receive mode. According to embodiments described herein, the power bridge circuit 311 corresponds to a circuit element that is used by the inductive signal interface 310 when in both power transmit and power receive modes. More specifically, the power bridge circuit 311 forms separate circuits for when the inductive signal interface 310 is in the power transmit mode and in the power receive mode. In particular, the circuit elements include some circuit elements that are shared and used in both modes, and other circuit elements that are dedicated for a particular one of the two modes. In some embodiments, the circuit elements are provided as branches, where two branches combine to route incoming and outgoing current over the inductive link 330. In one embodiment, the power bridge circuit 311 has a three-legged formation, which provides a shared branch that combines with (i) a second branch in order to transmit power over the inductive link 330, and (ii) a third branch in order to receive power over the inductive link 330. As described below, the three branches combine to effectively form an H-bridge and synchronous bridge rectifier combination for use with the inductive link 330.

In some embodiments, such as when the first electronic device 302 is ambidextrous, control circuit 313 transmits a plurality of switch control signals to control the operation of the power bridge circuit 311. The control signals include signals that specify or select the mode of operation for the inductive signal interface 310. As an addition or alternative, control signals may be generated by other circuitry within the first electronic device 302. For example, an inductive charger having the inductive signal interface 310 may include internal registers that are programmed to configure the inductive signal interface 310 to operate in a power transmit mode. In response to receiving the one or more control signals, the control circuit 313 is configured to generate and transmit the plurality of switch control signals to operate the power bridge circuit 311.

In usages when inductive signal interface 310 is in a power receive mode, the power signal is received from the second electronic device 320 over the inductive link 330. The inductive signal interface 310 may be coupled to a power storage element, such as a rechargeable battery. The inductive signal interface 310 may be configured to charge the power storage element or to provide power to other circuitry within the first electronic device through the voltage supply line. The power circuit 314 receives current transmitted from the power bridge circuit 311 and is configurable to perform voltage and current regulation in order to charge the power storage element or provide power to other circuitry. The bi-directional coil assembly 312 receives power inductively from the second electronic device 320, the power bridge circuit 311 converts AC current received inductively at the bi-directional coil assembly 312 to DC current to be transferred to the power circuit via the power bus.

Figure 4:
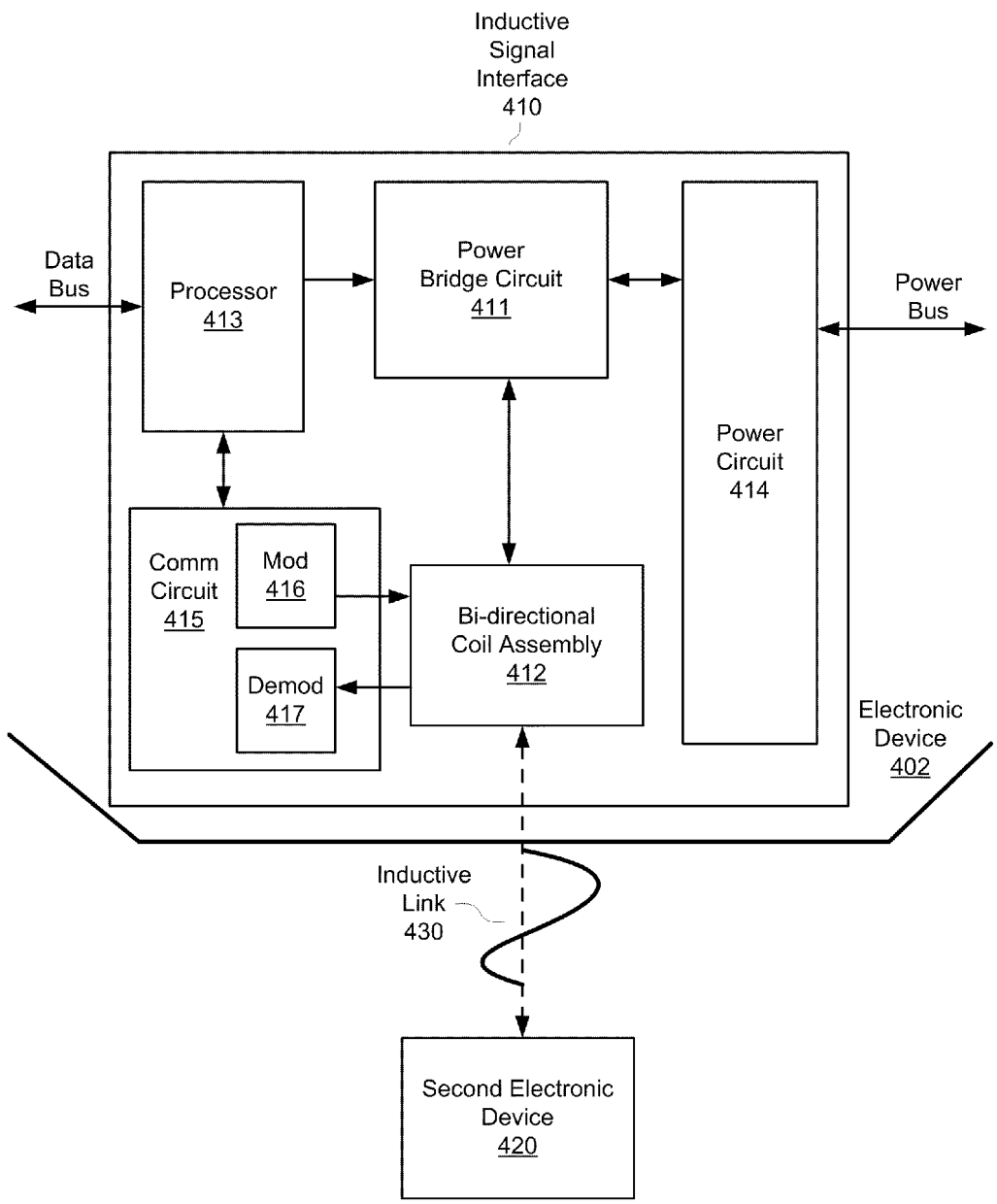
FIG. 4 illustrates an inductive signal interface capable of performing data transfer through an inductive link, under another embodiment.

FIG. 4 illustrates an embodiment of the inductive signal interface capable of performing data transfer through an inductive link. According to an embodiment, the inductive signal interface 410 resides on an electronic device 402 (e.g. mobile computing device or dock) and includes a power bridge circuit 411, a bi-directional coil assembly 412, a processor 413, a power circuit 414, and a communication circuit 415. Similar to the inductive signal interface 310 of FIG. 3, the inductive signal interface 410 may reside on any device that is capable of inductively receiving or transmitting power with another suitably configured device. As with an embodiment of FIG. 3, a first computing device uses the inductive signal interface 410 to form an inductive link 430 with a second electronic device 420. The second electronic device may also include an embodiment of inductive signal interface 410.

Similar to the inductive signal interface 310 of FIG. 3, certain implementations of the inductive signal interface 410 is able to operate in power transmit and receive modes. The mode of operation of the inductive signal interface 410 may be based on an identification and/or a status of the second electronic device 420. In particular, the inductive signal interface 410 may be configured to (i) operate in the power transmit mode if it is identified that the second electronic device 420 is configurable to receive power inductively via the inductive link 430; (ii) in the power receive mode if it is determined that the second electronic interface 420 is a dock or a charger. The transfer of identification and status information may occur as data transmission via the inductive link 430.

According to some embodiments, the mode of operation of the inductive signal interface 410 also depends on a status of the electronic device 402. For example, if a status of a rechargeable battery (not shown) on the electronic device 402 indicates that the rechargeable battery is not fully charged, the inductive signal interface 410 can be configured to operate in a power receive mode, when it would otherwise operate in the power transmit mode.

The power circuit 414 operates in a similar fashion as the power circuit 314 of FIG. 3 to handle current received in either the power transfer mode or the power receive mode. The power bridge circuit 411 operates in a similar fashion as the power bridge circuit 311 of FIG. 3.

The bi-directional coil assembly 412 is configurable to form the inductive link 430 with the second electronic device 420. The bi-directional coil assembly 412 is coupled to the power bridge circuit 411 to transmit and/or receive a power signal. The bi-directional coil assembly 412 operates in a similar fashion as the bi-directional coil assembly 312 of FIG. 3 to transmit and receive the power signal. The bi-directional coil assembly 412 is also coupled to the communication circuit 415 to receive and transmit modulated data signals.

During the power receive mode of the inductive signal interface 410, the bi-directional coil assembly 412 receives power over the inductive link 430 from the second electronic device 420. The power signal is transmitted in modulated form over the power bridge circuit 411, which performs rectification to output a DC current to the power circuit 414. The power circuit 414 is configured to clamp current levels, regulate voltage levels, and perform other functions to transmit an outgoing power signal in the power receive mode. According to embodiments, the resulting power signal is a DC signal and is routed to: (i) charge a rechargeable battery within the electronic device 402, and/or (ii) provide power to circuit elements within the electronic device.

During the power transmit mode of the inductive signal interface 410, the bi-directional coil assembly 412 is used to carry the modulated power signal to the second electronic device 420. The power may originate from another component on the electronic device 402, such as a battery (not shown) or from other power sources, such as a wall adapter (not shown). The power circuit 414 is configured to treat the incoming power signal (as described above) to transmit a treated outgoing power signal to the power bridge circuit 411. According to some embodiments, the output power signal of the power circuit 414 to the power bridge circuit 411 in the power transmit mode is substantially a DC signal, and the power bridge circuit 411 performs DC to high-frequency conversion to output a high-frequency power signal to the bi-directional coil assembly 412. The bi-directional coil assembly 412 transmits power via the inductive link 430 to the second electronic device 420.

In some embodiments, inductive signal interface 410 is configurable to transfer data as well as power via the inductive link 430. In an embodiment, data transmitted over the inductive link 430 includes data that corresponds to identification or status information of the electronic device 402 and/or the second electronic device 420. As described above, the identification and status information may be used to control the mode of operation of the inductive signal interface 410. Data transmitted over the inductive link 430 may also include commands from the electronic device 402 to the second electronic device 420, or vice-versa. As an example, the electronic device 402, which is a mobile computing device, includes an embodiment of the inductive signal interface 410, and the second electronic device 420 is a dock. The inductive signal interface 410 is configured to exchange data corresponding to identification and status information of the dock and/or the mobile computing device via the inductive link 430. Upon processing the data, the mobile computing device transmits commands over the inductive link 430 to cause the dock to enter the power transmit mode of operation. The mobile computing device also executes commands to cause the inductive signal interface 410 to enter the power receive mode of operation. In some embodiments, the inductive signal interface 410 is used to transmit or receive power signal requirements. In power receive mode, the electronic device 402 may transmit out its power supply requirements so as to enable the other computing device to adjust the level of the transmitted power signal to fit the needs of the power receiving device. In power transmit mode, the electronic device 402 may signal data to enable a data loop in which the second device (as the power receiver) to signal back real-time information about its power needs. Specific examples of the type of data that can be communicated over using the inductive signal interface is described in U.S. patent application Ser. No. 12/478,766, entitled "Inductive Signal Transfer System for Computing Devices"; the aforementioned application being hereby incorporated by reference in its entirety for all purposes. As described, the data that may be send over inductive link 430 may include a specific format and structure, under an inductive communication protocol that both devices share. As part of a communication protocol, the inductive signal interface 410 may be used to signal data to implement parts of the communication protocol, such as detecting presence of the second device, authenticating itself and/or the second device, and enumerating itself.

According to some embodiments, data transmitted over the inductive link 430 includes communication data transferred between the electronic device 402 and the second electronic device 420. In certain implementations, such as when a mobile computing device is inductively coupled with an audio dock, the communication data may extend to media data (e.g. audio). Other types of data that may be communicated across the inductive signal interface 410 include application data (e.g. a remote control application is transferred and installed over the inductive link).

In some embodiments, the data transfer between the inductive signal interface 410 and the second electronic device 420 occurs in a half-duplex fashion. In other embodiments, the data transfer between the inductive signal interface and the second electronic device occurs in a full-duplex manner, wherein outgoing and incoming modulated data signals use different carrier frequencies. The incoming modulated data signal is received inductively via the inductive link 430, and the outgoing modulated data signal is transmitted to the second electronic device via the inductive link 430. According to certain embodiments, outgoing data is modulated by the power signal from the power bridge circuit 411 to become the outgoing modulated data signal. As an addition or alternative, outgoing data may be modulated by carrier waves having different frequencies compared with the power signal. Filters may be employed within the inductive signal interface 410 to separate the modulated data signals from the power signal.

The communication circuit 415 is coupled to the bi-directional coil assembly 412 in order to transmit and receive data over the inductive link 430. The communication circuit includes a modulator 416 and a demodulator 417. The modulator 416 is configured to output an outgoing modulated data signal to the bi-directional coil assembly 412 to transmit the modulated data signals to the second electronic device via the inductive link 420. The demodulator 417 is coupled to the bi-directional coil assembly 412 to receive an incoming modulated data signal received over the inductive link 430.

According to embodiments, the modulation and demodulation schemes used by the modulator 416 and the demodulator 417, respectively, may implement modulation schemes such as amplitude modulation, frequency modulation, digital modulation (such as frequency-shift keying (FSK) modulation, or phase-shift keying (PSK) modulation).

The incoming modulated data signal received over the inductive link 420 is transmitted to the demodulator 417, which performs demodulation to generate a demodulated data signal. The communication circuit 415 transmits the demodulated data signal to the processor 413 for processing or transmission to other components of the electronic device 402.

Outgoing data may be received over the data bus by the processor 413. Alternatively, the outgoing data may originate from the processor 413. The processor 413 transmits the outgoing data to the communication circuit 415. The modulator 416 modulates the outgoing data with a carrier wave to generate the outgoing modulated data signal which is transmitted to the second electronic device via the inductive signal interface 430.

The communication circuit 415 is coupled to the processor 413 to transmit and receive data which is transferred via the data bus to and from the processor 413. The processor 413 may be configured to process identification and status information transmitted over the inductive signal interface 430 to determine a mode of operation of the inductive signal interface 410. The processor is also coupled to the power bridge circuit 411 to control the operation of the power bridge circuit 411 based on the determined mode of operation. The processor 413 may also be configured to process communication data received from over the inductive link, or from other communication mediums (e.g. BLUETOOTH).

Figure 5:
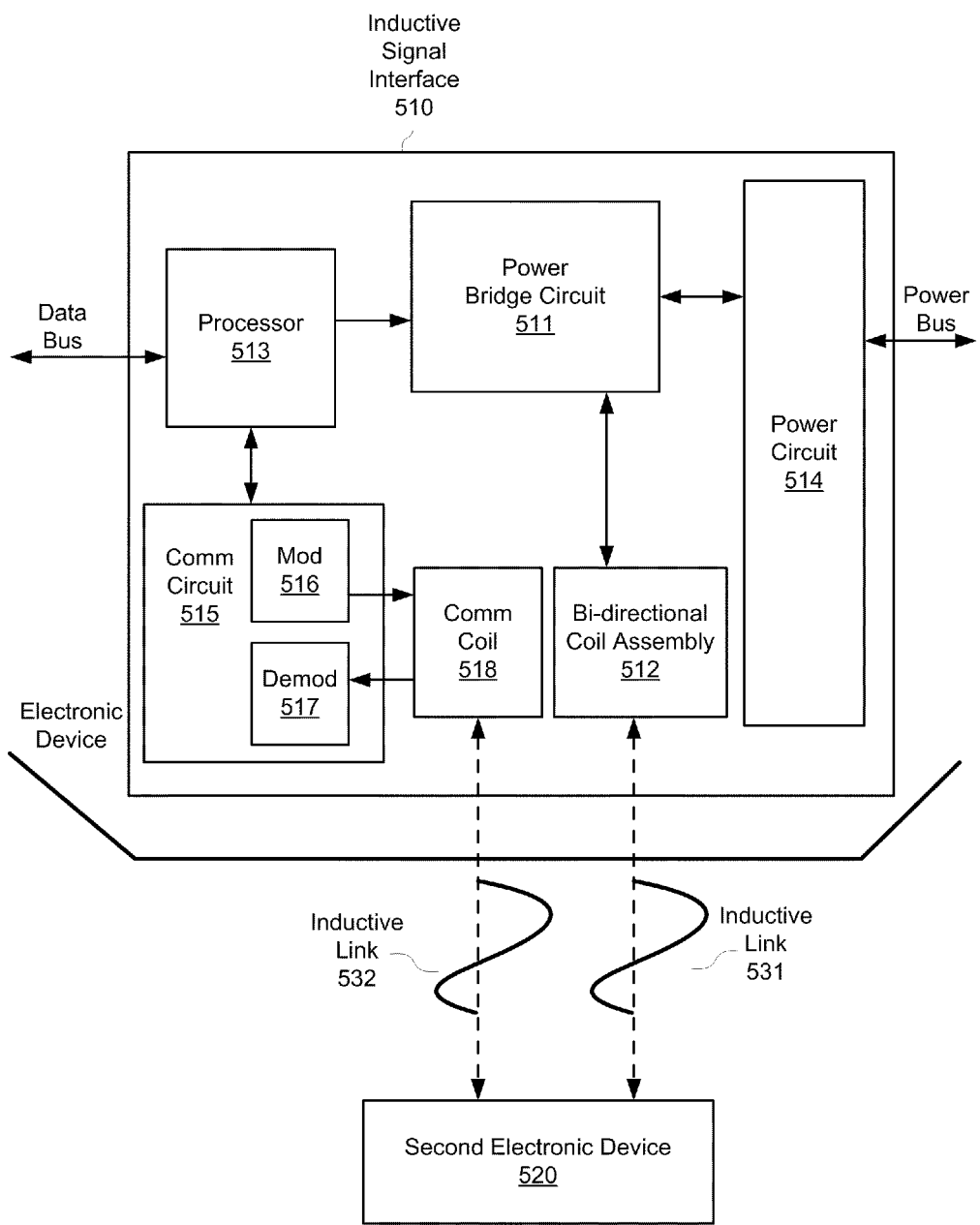
FIG. 5 illustrates an inductive signal interface capable of performing inductive data transfer, under another embodiment.

FIG. 5 illustrates another embodiment of the inductive signal interface capable of performing inductive data transfer. Inductive signal interface 510 includes a power bridge circuit 511, a bi-directional coil assembly 512, a processor 513, a power circuit 514, a communications circuit 515, and a communication coil 518. The inductive signal interface 510 is able to form inductive links 531 and 532 with a second electronic device 520. Similar to the inductive signal interfaces 410 of FIG. 4, the inductive signal interface 510 may reside on any device that is capable of inductively receiving or transmitting power and/or data with another suitably configured device.

The power bridge circuit 511, processor 513, and power circuit 514 operate in similar fashion as corresponding elements of the inductive signal interface 410 of FIG. 4. The bi-directional coil assembly 512 operates in a similar fashion as the bi-directional coil assembly 312 of FIG. 3 to transmit or receive a power signal via the inductive link 531.

The inductive signal interface 510 is configurable to transmit and receive modulated data signals via the inductive link 532. The communication coil 518 is able to form the inductive link 532 with the second electronic device 520 to transmit and receive modulated data signals. The communication coil 518 is coupled to the communication circuit 515.

The communication circuit 515 includes a modulator 516 and a demodulator 517. The modulator 516 and demodulator 517 are coupled to the communication coil 518. The modulator 516 operates in a similar fashion as the modulator 416 of FIG. 4 in generating an outgoing modulated data signal from data received from the processor 513 to be outputted via the inductive link 532 to the second electronic device 520.

The incoming data signal is transmitted to the demodulator 517 which operates in a similar fashion as the demodulator 417 of FIG. 4 in generating a demodulated communication data signal from the incoming data signal. The demodulated communication data signal is transmitted by the communication circuit 515 to the processor 513 for: i) transmission over the data bus to other circuits within the electronic device 402, or ii) processing by the processor 413.

Figure 6A:
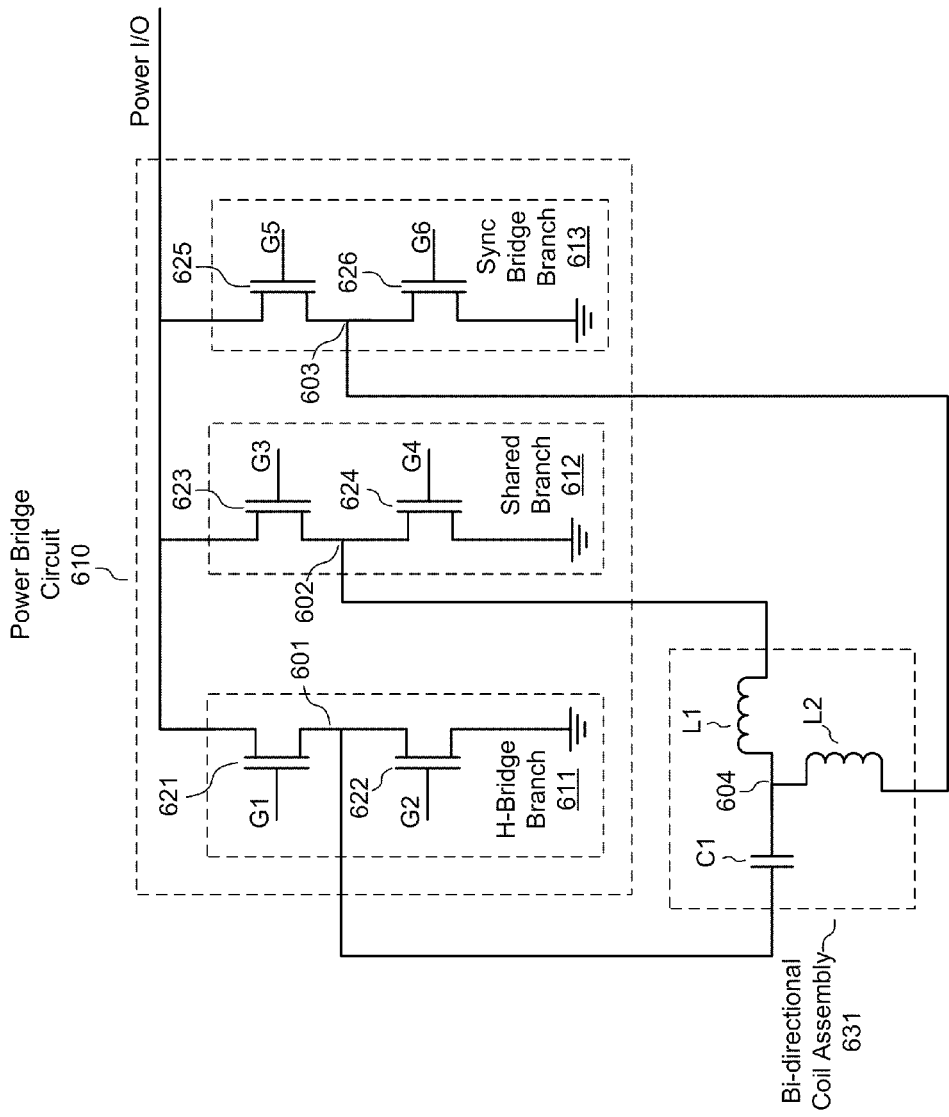
FIG. 6A illustrates circuit level embodiments of the power bridge and the bi-directional coil assembly.

FIG. 6A illustrates a circuit level embodiment of the power bridge circuit 311, 411, 511 and the bi-directional coil assembly 312, 412, 512 of FIGS. 3, 4, and 5, respectively. An embodiment depicted shows the power bridge circuit 610 as being "3-legged", meaning the power bridge circuit includes an H-bridge branch, a synchronous bridge rectifier branch, and a shared branch for use with either the H-bridge or the synchronous bridge rectifier branch. In more detail, power bridge circuit 610 includes an H-bridge branch 611, a shared branch 612, and a sync bridge branch 613. The power bridge circuit 610 has a power input/output (I/O) to receive or transmit a DC current. Each of the three branches is coupled to the power I/O and includes two serially-connected switches. On each of the three branches, one of the serially-connected switches is coupled to the power I/O and the other of the serially-connected switches is coupled to a ground voltage level or a negative supply voltage. On each of the three branches, the node between the two serially-connected switches is coupled to the bi-directional coil assembly 631. The H-bridge branch 611 includes switches 621 and 622 which are connected at a node 601 and are controlled by signals G1 and G2 respectively. The shared branch 612 includes switches 623 and 624 which are connected at a node 602 and are controlled by signals G3 and G4 respectively. The sync bridge branch 613 includes switches 625 and 626 which are connected at a node 603 and are controlled by signals G5 and G6 respectively.

The bi-directional coil assembly 631 is coupled to all three branches of the power bridge circuit and includes a capacitor C1 and two inductive coils L1 and L2. The capacitor C1, inductive coils L1 and L2 are coupled to a node 604. C1 is also coupled to the H-bridge branch 611 at the node 601. Inductive coil L1 is also coupled to the shared branch 612 at node 602. Inductive coil L2 is also coupled to the sync bridge branch 613 at the node 603. The inductive coils L1 and L2 can form an inductive link with an second electronic device to transfer power and/or data.

The power bridge circuit 610 is operable in both the power receive and transmit modes of an inductive signal interface, such as the inductive signal interface 410 of FIG. 4. The operation of the power bridge circuit 610 is controlled by the signals G1-G6, which are transmitted by control logic coupled the switches 621-626. Referring back to FIGS. 3 and 4, for example, the control logic may be the control element 313 or processor 413.

In the power transmit mode of the inductive signal interface, the power I/O transmits an input DC current to the power bridge circuit 610. Referring back to FIGS. 3 and 4, for example, the input DC current can be a regulated current transmitted by the power circuit 314 or 414. In the power transmit mode, G5 and G6 are de-asserted by the control logic so that the switches 625 and 626 in the sync bridge branch 613 are in an off (i.e. open) state. Thus, the sync bridge branch 613 is off while the H-bridge branch 611 and the shared branch 612 are active. Accordingly, current flow through the inductor L2 is turned off and current flow through the bi-directional coil assembly 631 is directed through the series combination of capacitor C1 and inductive coil L1.

In the power receive mode of the inductive signal interface, the power I/O transmits an output DC current from the power bridge circuit 610. Referring back to FIGS. 3 and 4, for example, the output DC current may be transmitted via the power bus to the power circuit 314 or 414 which performs voltage and current regulation on the output DC current in order to output a regulated current. In this mode of operation of the inductive signal interface, the signals G1 and G2 de-asserted such that the switches 621 and 622 of the H-bridge branch 611 are in the off state. Thus, the H-bridge branch 611 is off while the sync bridge branch 613 and the shared branch 612 are active. By turning off the H-bridge branch 611, current flow through capacitor C1 is turned off and current flow through the bi-directional coil assembly 631 is directed through the series combination of inductive coils L1 and L2.

By selectively turning off the H-bridge branch 611 or the sync bridge branch 613, the power bridge circuit 610 is configurable to selectively turn off current paths in the bi-directional coil assembly 631 to change the impedance of the bi-directional coil assembly 631 based on the mode of operation of the inductive signal interface. For example, in the power receive mode of the inductive signal interface, the current paths through the bi-directional coil assembly 631 caused by the power bridge circuit 610 is the series combination of the capacitor C1 and the inductive coil L1. In the power transmit mode, the current path through bi-directional coil assembly 631 caused by the power bridge circuit 610 is the series combination of the inductive coils L1 and L2.

In certain embodiments, such as the one illustrated by FIG. 4, the inductive coil assembly 631 is coupled to a communication circuit (e.g. the communication circuit 415) in addition to the power bridge circuit 610 to transmit and receive data inductively. The bi-directional coil assembly can be configured to allow inductive data transfer during any of the modes of operation for the inductive signal interface, such as during the power transmit mode or the power receive mode.

Figure 6B:
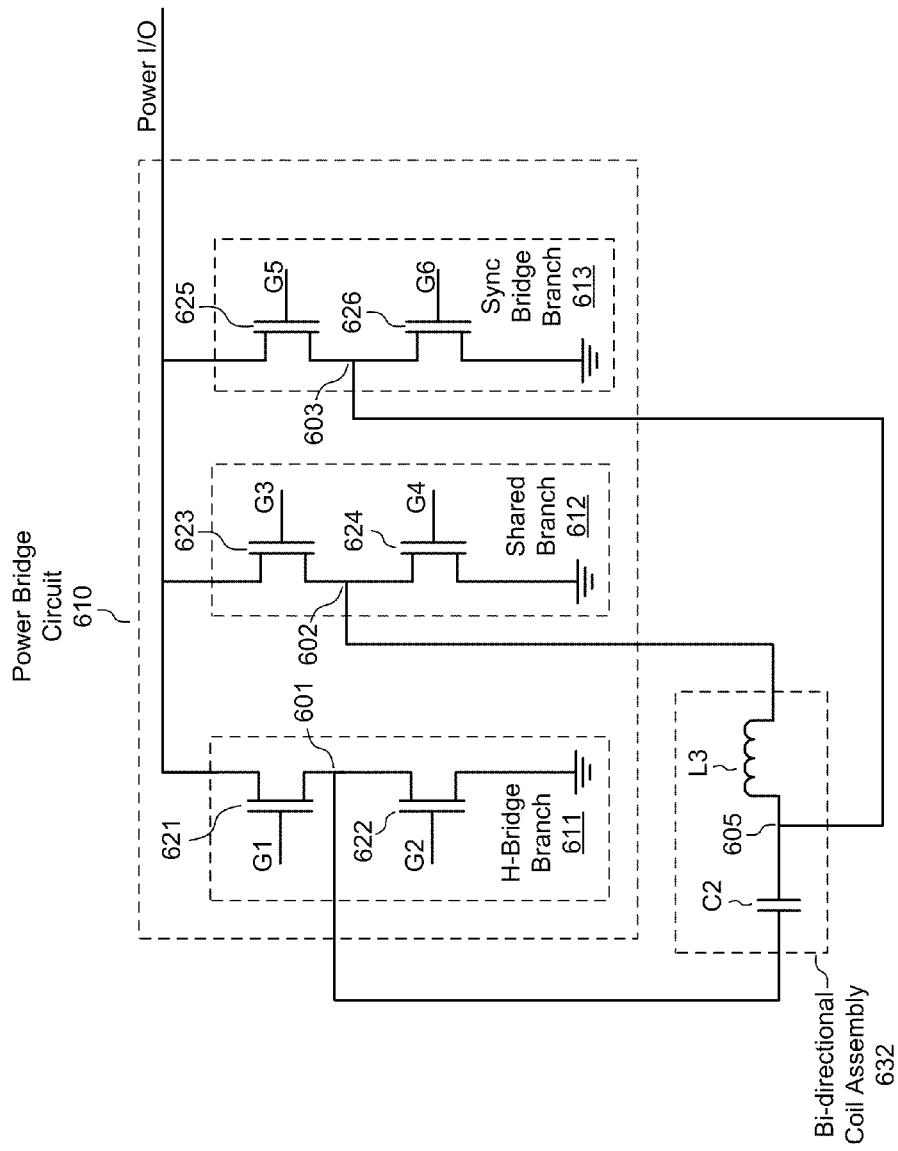
FIG. 6B is illustrates the power bridge circuit of FIG. 6A coupled to another bi-directional coil assembly, under another embodiment.

FIG. 6B illustrates the power bridge circuit 610 of FIG. 6A coupled to another embodiment of the bi-directional coil assembly. The bi-directional coil assembly 632 includes a capacitor C2 and an inductive coil L3. The capacitor C2 and inductive coil L3 are connected at a node 605. The capacitor C2 is coupled to the H-bridge branch 611 at the node 601. The inductor L3 is coupled to shared branch 612 at node 602. The node 605 of the bi-directional coil assembly 632 is coupled to the sync bridge branch 613 at node 603.

In the power transmit mode, the sync bridge branch 613 is turned off and the current path through the bi-directional coil assembly 632 is the series combination of the capacitor C2 and the inductive coil L3. In the power receive mode, the H-bridge branch 611 is turned off and the current path through the bi-directional coil assembly 632 is the inductive coil L3.

Figure 6C:
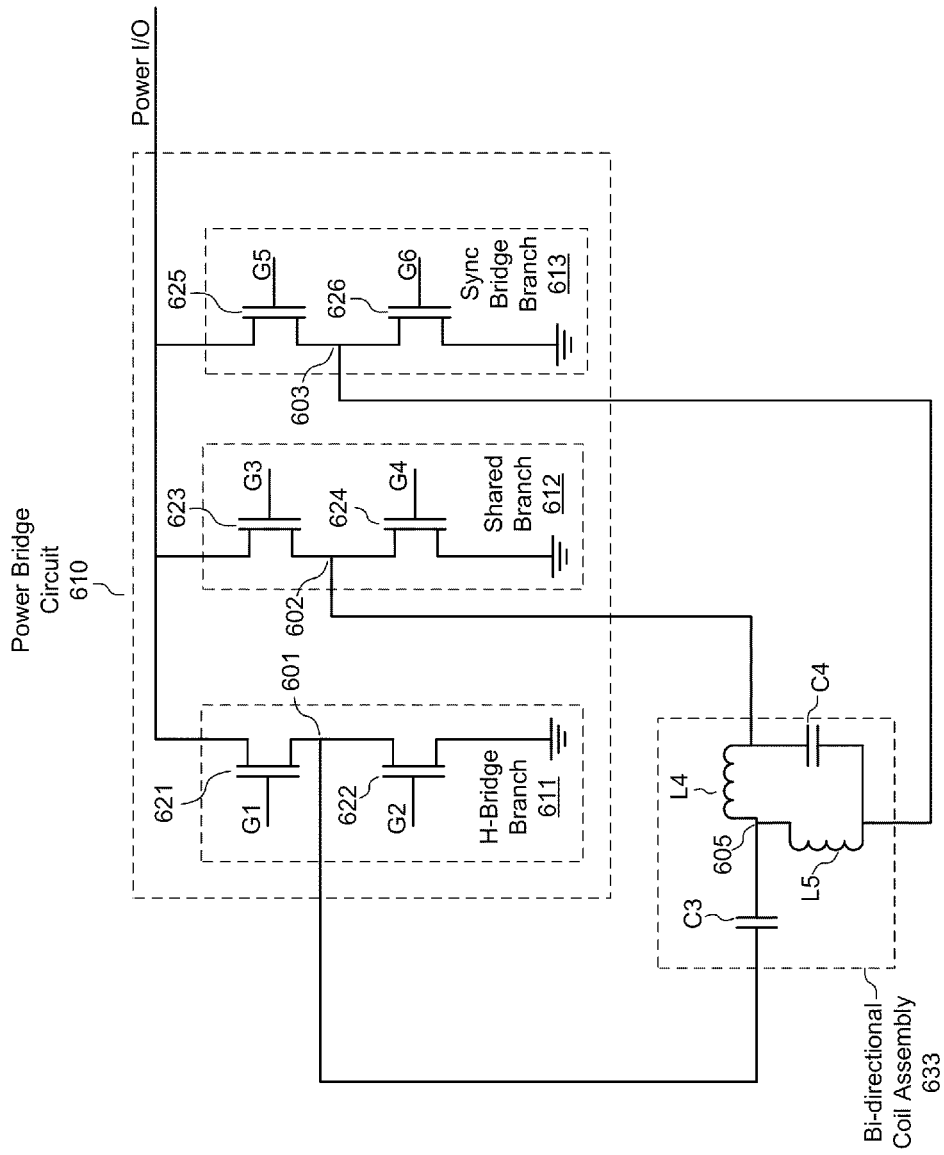
FIG. 6C illustrates the power bridge circuit of FIG. 6A coupled to a bi-directional coil assembly, under another embodiment.

FIG. 6C illustrates the power bridge circuit 610 of FIG. 6A coupled to bi-directional coil assembly, under another embodiment. The bi-directional coil assembly 633 includes capacitors C3 and C4, and inductive coils L4 and L5. The capacitor C3 and the inductive coils L4 and L5 are all coupled to a node 605. The capacitor C3 is also coupled to the H-bridge branch 611 at the node 601. The inductive coil L4 is further coupled to the shared branch 612 at the node 602. The inductive coil L5 is coupled to both the node 605 and the node 603 on the sync bridge branch 613. The capacitor C4 is coupled to both the shared branch 612 at the node 602, and the sync bridge branch at the node 603.

In the power transmit mode, the sync bridge branch 613 is turned off and the current path through the bi-directional coil assembly 633 is the series combination of the capacitor C3 and the inductive coil L4. In the power receive mode, the H-bridge branch 611 is turned off and the current path through the bi-directional coil assembly 633 is the series combination of inductive coils L4 and L5 in parallel with the capacitor C4.

Figure 6D:
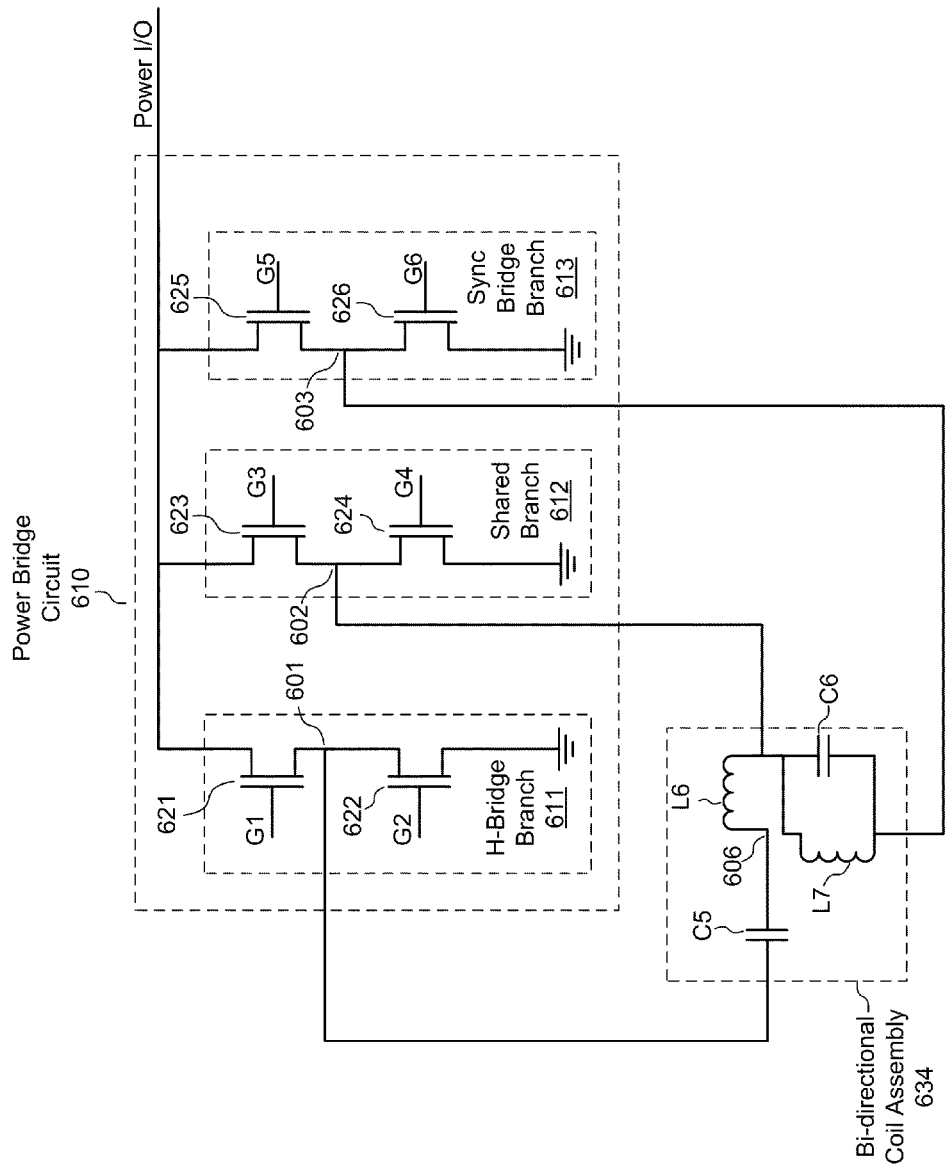
FIG. 6D illustrates the power bridge circuit of FIG. 6A coupled to a bi-directional coil assembly, under another embodiment.

FIG. 6D illustrates the power bridge circuit 610 of FIG. 6A coupled to yet another embodiment of the bi-directional coil assembly. The bi-directional coil assembly 634 includes capacitors C5 and C6, and inductive coils L6 and L7. The capacitor C5 and the inductive coil L6 are coupled to a node 606. The capacitor C5 is also coupled to the H-bridge branch 611 at the node 601. The inductive coil L6 is further coupled to the shared branch 612 at the node 602. The capacitor C6 and the inductive coil L7 are coupled in parallel and are coupled to both the shared bridge branch 612 at the node 602 and the sync bridge branch 613 at the node 603.

In the power transmit mode, the sync bridge branch 613 is turned off and the current path through the bi-directional coil assembly 634 is the series combination of the capacitor C5 and the inductive coil L6. In the power receive mode, the H-bridge branch 611 is turned off and the current path through the bi-directional coil assembly 634 is parallel combination of the inductive coil L7 and the capacitor C6.

Figure 7A:
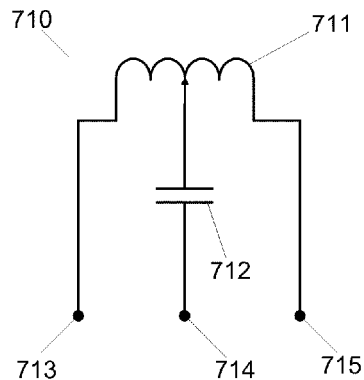
FIG. 7A illustrates an embodiment of a bi-directional coil assembly.

FIG. 7A illustrates an embodiment of a bi-directional coil assembly. A bi-directional coil assembly 710 includes an inductive coil 711, and a capacitor 712. The inductive coil is coupled to a node 713 and a node 715. The inductive coil 711 has a tap coupled to the capacitor 712. The capacitor is also coupled to a node 714 as illustrated. The nodes 713-715 are coupled to the power circuit bridge 610 of FIGS. 6A and 6B. According to an embodiment and referring back to FIG. 6A, the node 713 is coupled to the shared branch 612 at node 602, the node 714 is coupled to the H-bridge branch 611 at node 601, and the node 715 is coupled to the sync bridge branch 613 at node 613. In an alternative embodiment, such as element 631 of FIG. 6A, the bi-directional coil assembly 710 includes two separate inductive coils coupled together instead of having an inductive coil 711 with a tap.

Figure 7D:
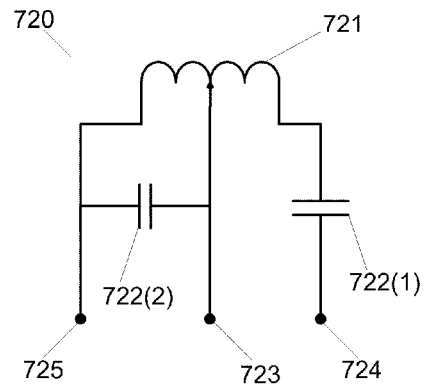
FIG. 7D illustrates another embodiment of the bi-directional coil assembly.
Figure 7B:
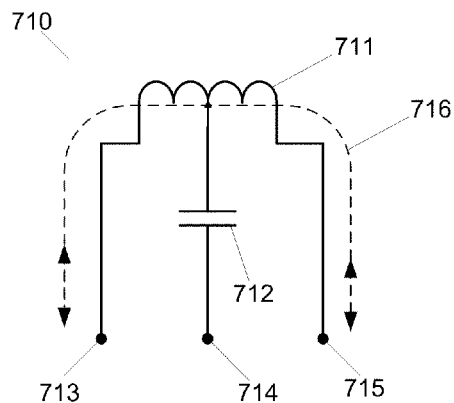
FIG. 7B illustrates a current path within the inductive coil assembly of FIG. 7A during a power receive mode.

FIG. 7B illustrates a current path 716 within the inductive coil assembly during the power receive mode of the inductive signal interface. Referring back again to FIG. 6A, the H-bridge branch 611 is disabled during the power receive mode of the inductive signal interface. Accordingly, the power bridge circuit 610 provides the current path 716 between node 715 and 713 during the power receive mode. The current path 716 includes the inductive coil 711.

Figure 7E:
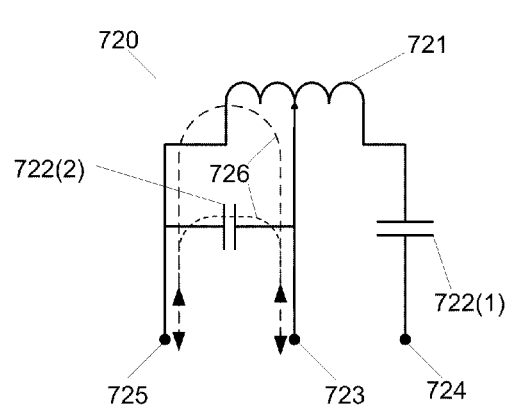
FIG. 7E illustrates a current path within the inductive coil assembly of FIG. 7D during the power receive mode.
Figure 7C:
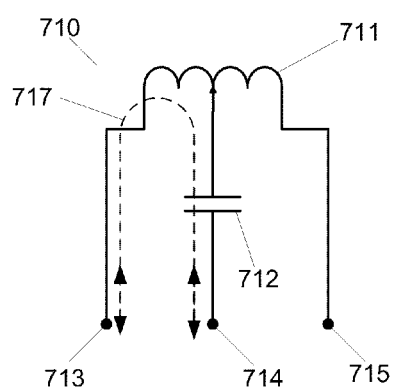
FIG. 7C illustrates a current path within the inductive coil assembly of FIG. 7A during the power transmit mode.

FIG. 7C illustrates a current path 717 within the inductive coil assembly during the power transmit mode of the inductive signal interface. The sync bridge branch 613 of FIG. 6A is disabled during the power transmit mode of the inductive signal interface. As a result, the power bridge circuit 610 provides the current path 717 between node 715 and 713 during the power transmit mode. The current path 717 includes at least a portion of the inductive coil 711 and the capacitor 712 in series.

FIG. 7D illustrates another embodiment of the bi-directional coil assembly. A bi-directional coil assembly 720 includes an inductive coil 721, and capacitors 722(1) and 722(2). The inductive coil is coupled to a node 725 and the capacitor 722(1). The capacitor 722(1) is also coupled to a node 724 as illustrated. The inductive coil 721 has a tap coupled to a node 723. The capacitor 722(2) is coupled to the nodes 725 and 723. The nodes 723-725 are coupled to the power circuit bridge 610 of FIGS. 6A and 6B. According to an embodiment and referring back to FIG. 6A, the node 723 is coupled to the shared branch 612 at node 602, the node 724 is coupled to the H-bridge branch 611 at node 601, and the node 725 is coupled to the sync bridge branch 613 at node 603. In an alternative embodiment, the bi-directional coil assembly 720 includes two inductive coils coupled together instead of having an inductive coil 721 with a tap.

FIG. 7E illustrates a current path 726 within the inductive coil assembly 720 during the power receive mode of the inductive signal interface. Referring back again to FIG. 6A, the H-bridge branch 611 is disabled during the power receive mode of the inductive signal interface. As a result, the power bridge circuit 610 provides the current path 726 between node 725 and 723 during the power receive mode which includes the parallel combination of at least a portion of the inductive coil 721 and the capacitor 722(2).

Figure 7F:
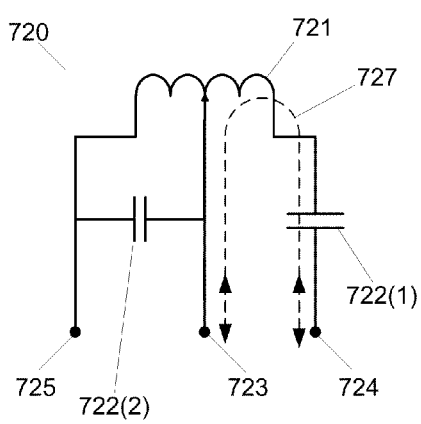
FIG. 7F illustrates a current path within the inductive coil assembly of FIG. 7D during the power transmit mode.

FIG. 7F illustrates a current path 727 within the inductive coil assembly 720 during the power transmit mode of the inductive signal interface. The sync bridge branch 613 of FIG. 6A is disabled during the power transmit mode of the inductive signal interface. As a result, the power bridge circuit 610 provides the current path 727 between node 725 and 723 during the power transmit mode. The current path 727 includes a series combination of at least a portion of the inductive coil 721 and the capacitor 722(1)

According to embodiments, the bi-directional coil assemblies 631, 632 of FIGS. 6A and 6B, respectively, may be alternatively configured according to any of the coil assembly topologies described above. Other variations are similarly possible.

FIG. 8A illustrates an operation of the power bridge circuit 610 of FIGS. 6A-6D in the power transmit mode. The power bridge circuit 610 is configured to operate to deliver a current from the power I/O to a bi-directional coil assembly 810, which may be any previously discussed coil assembly topology. In the power transmit mode, the sync bridge branch 613 is disabled, and the H-bridge branch 611 and the shared branch 612 are operable to deliver current from the signal line Power I/O, to the bi-directional coil assembly 810, and finally to ground voltage along a current path 801.

Figure 8B:
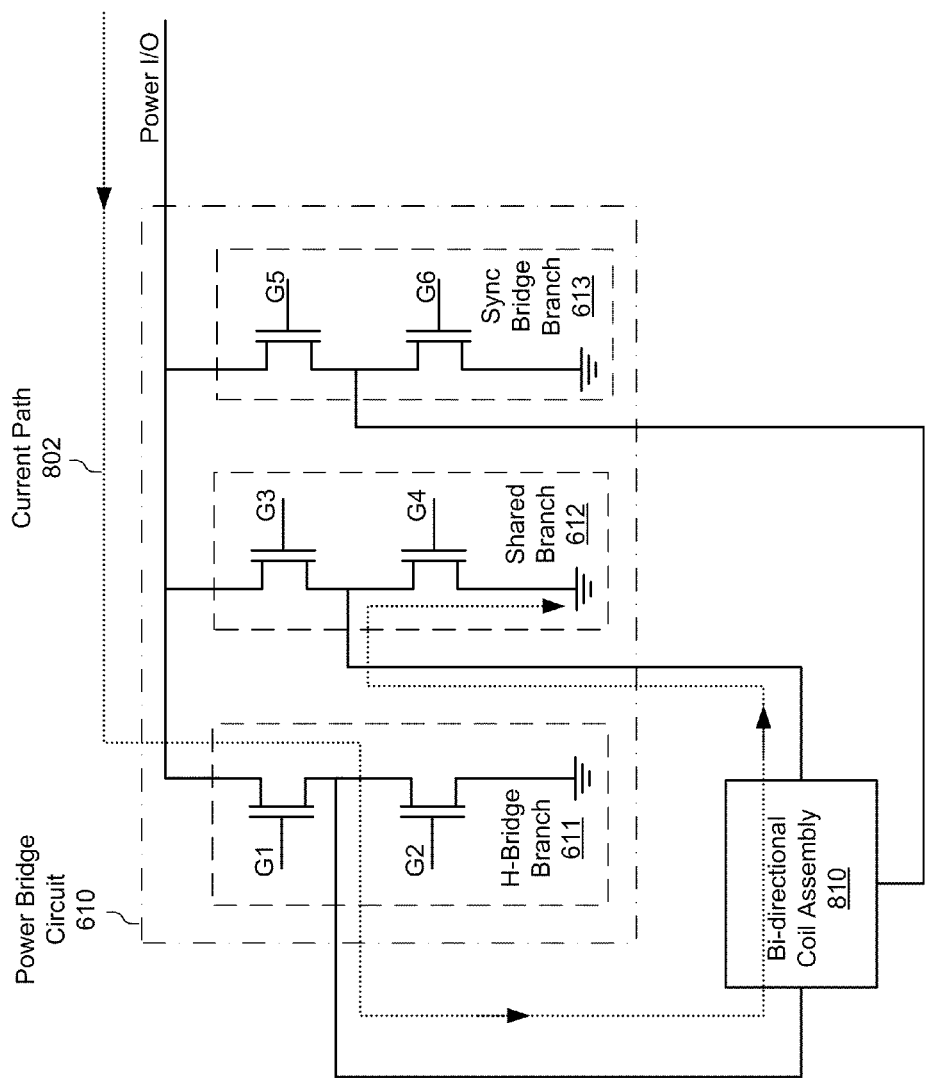
FIG. 8B illustrates another operation of an embodiment of the power bridge circuit in the power transmit mode.

FIG. 8B illustrates another operation of the power bridge circuit 610 of FIGS. 6A-6D in the power transmit mode. The H-bridge branch 611 and the shared branch 612 are operable to deliver current from the signal line Power I/O, to the bi-directional coil assembly 810, and finally to ground voltage along a current path 802.

As shown in FIGS. 8A and 8B, in the power transmit mode, the power bridge circuit 610 of FIG. 6A is configurable to deliver a current to the bi-directional coil assembly 810 in a first direction (corresponding to the current path 801) and a reverse direction (corresponding to the current path 802). According to some embodiments, by delivering current in the first and the reverse directions to the bi-directional coil assembly 810, the power bridge circuit 610 is operable to convert a received DC power signal to a high frequency power signal and to deliver the high frequency power signal to the bi-directional coil assembly 810.

Figure 8C:
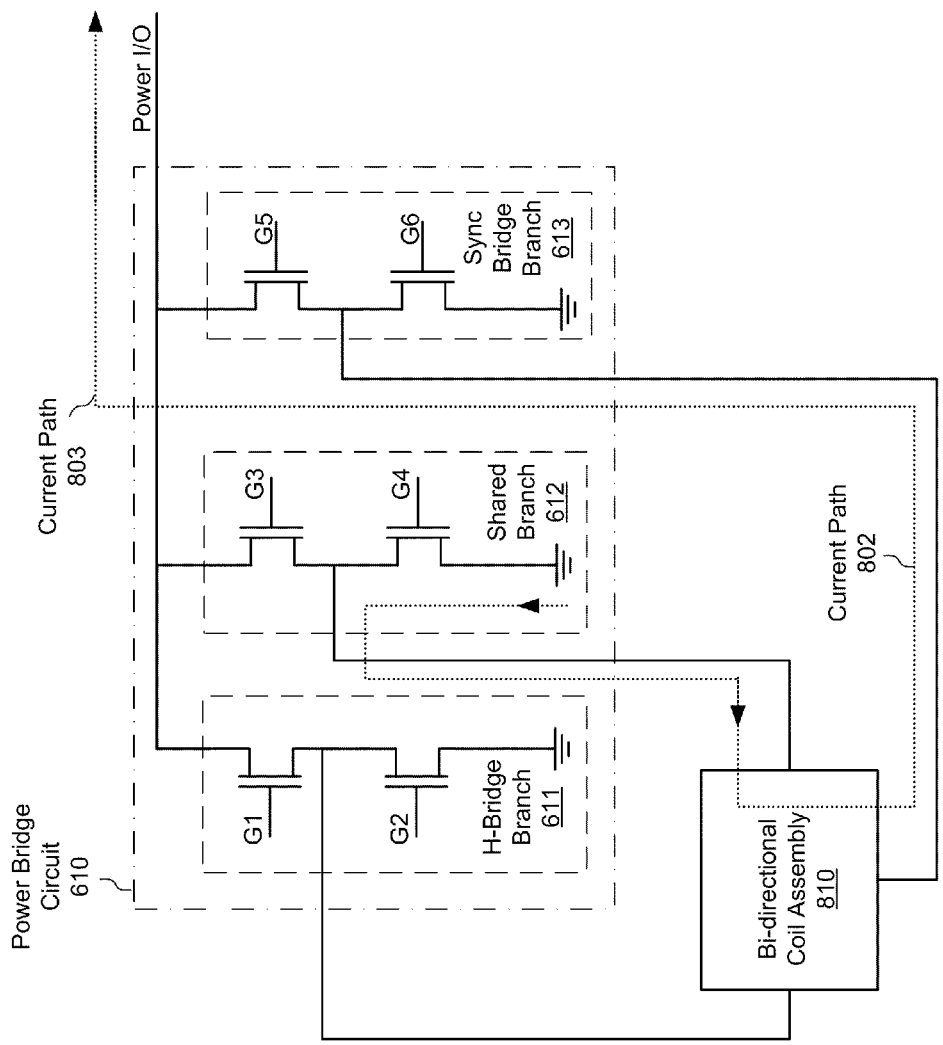
FIG. 8C illustrates an operation of an embodiment of the power bridge circuit in the power receive mode.

FIG. 8C illustrates an operation of the power bridge circuit 610 of FIGS. 6A-6D in the power receive mode. The power bridge circuit 610 is configured to operate to deliver a current from the bi-directional coil assembly 810 to the signal line Power I/O. In the power receive mode, the H-bridge branch 611 is disabled, and the sync bridge branch 613 and the shared branch 612 are operable to deliver current from ground voltage to the bi-directional coil assembly 810, and finally to the signal line Power I/O along a current path 803.

Figure 8D:
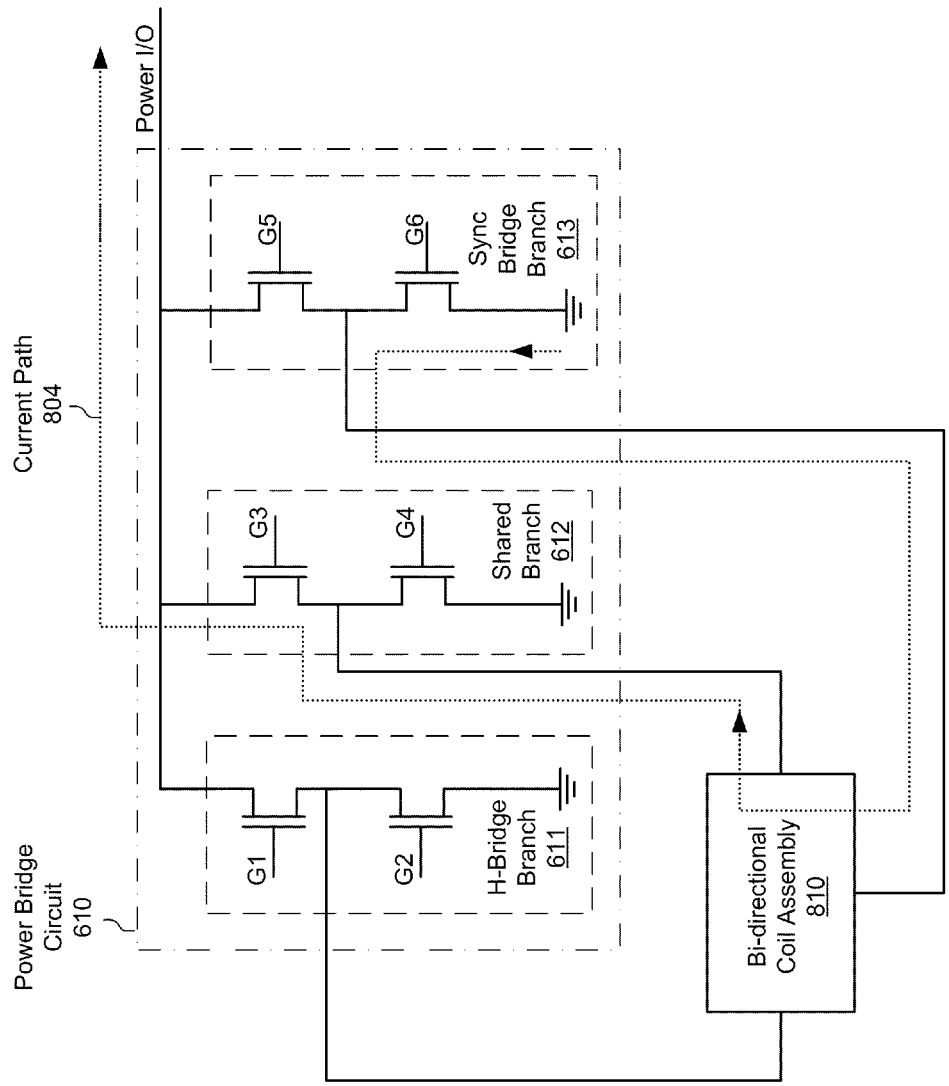
FIG. 8D illustrates another operation of an embodiment of the power bridge circuit in the power receive mode.

FIG. 8D illustrates another operation of the power bridge circuit 610 of FIGS. 6A-6D in the power receive mode. The sync bridge branch 613 and the shared branch 612 are operable to deliver current from ground voltage to the bi-directional coil assembly 810, and finally to the signal line Power I/O along a current path 804.

As shown in FIGS. 8C and 8D, in the power receive mode, the power bridge circuit 610 is configurable to carry a current from the bi-directional coil assembly 810 in a first direction (corresponding to the current path 803) and a reverse direction (corresponding to the current path 804). According to some embodiments, by carrying current in the first and the reverse directions from the bi-directional coil assembly 810 to the signal line Power I/O, the power bridge circuit 610 is operable to convert a high frequency power signal to a DC power signal and to deliver the DC power signal to the signal line Power I/O.

Figure 8E:
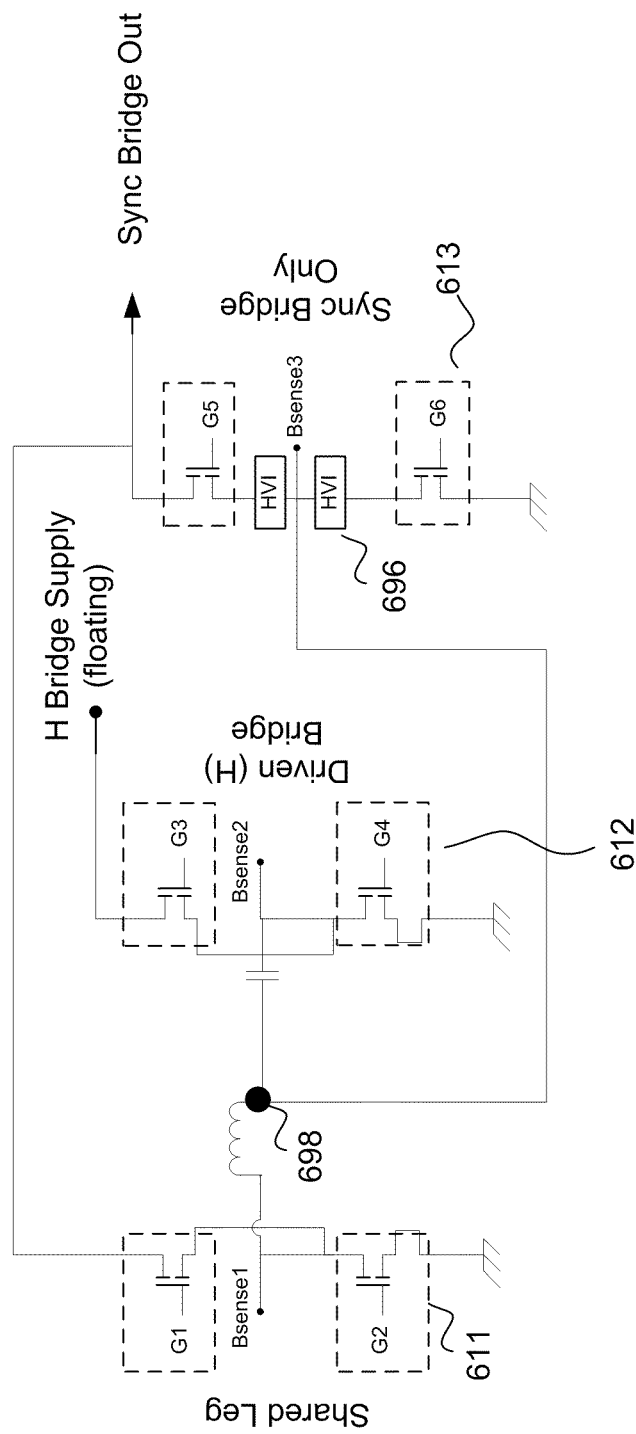
FIG. 8E illustrates another embodiment that includes consideration of a flying node, under an embodiment.

Embodiments recognize that in at least some configurations, potential exist for one of the creation of a 'flying node'—a node that acquires, at least in momentary instances, a voltage that is significantly higher than the voltage of its surrounding nodes. FIG. 8E depicts a configuration that handles the occurrence of a flying node 698, arising as a result of switching behavior at surrounding switches. Flying node 698 negatively affects the sync bridge branch 613, as the H-bridge branch 611 and shared branch 612 are protected by either an inductor or capacitor. The flying node 698 is most problematic when relatively low tolerant FETs are used on at least the sync bridge branch 613. An embodiment as depicted incorporates high voltage isolation devices 696, which protect the sync bridge branch 613 when FETs are used for the respective gates. More specifically, the high voltage isolation devices 696 prevent low tolerance FETs from operating at voltages that exceed their respective operating voltage levels as a result of high voltages generated at the flying node 698. Moreover, as the FETs typically incorporate diodes, unwanted diodic behavior resulting from high voltages is also avoided. The high voltage isolation devices 696 can be implemented in various forms, including through use of FETs or other switches that allow the high voltage isolation devices 696 to be protected from high voltages stemming from flying node 698.

Figure 9:
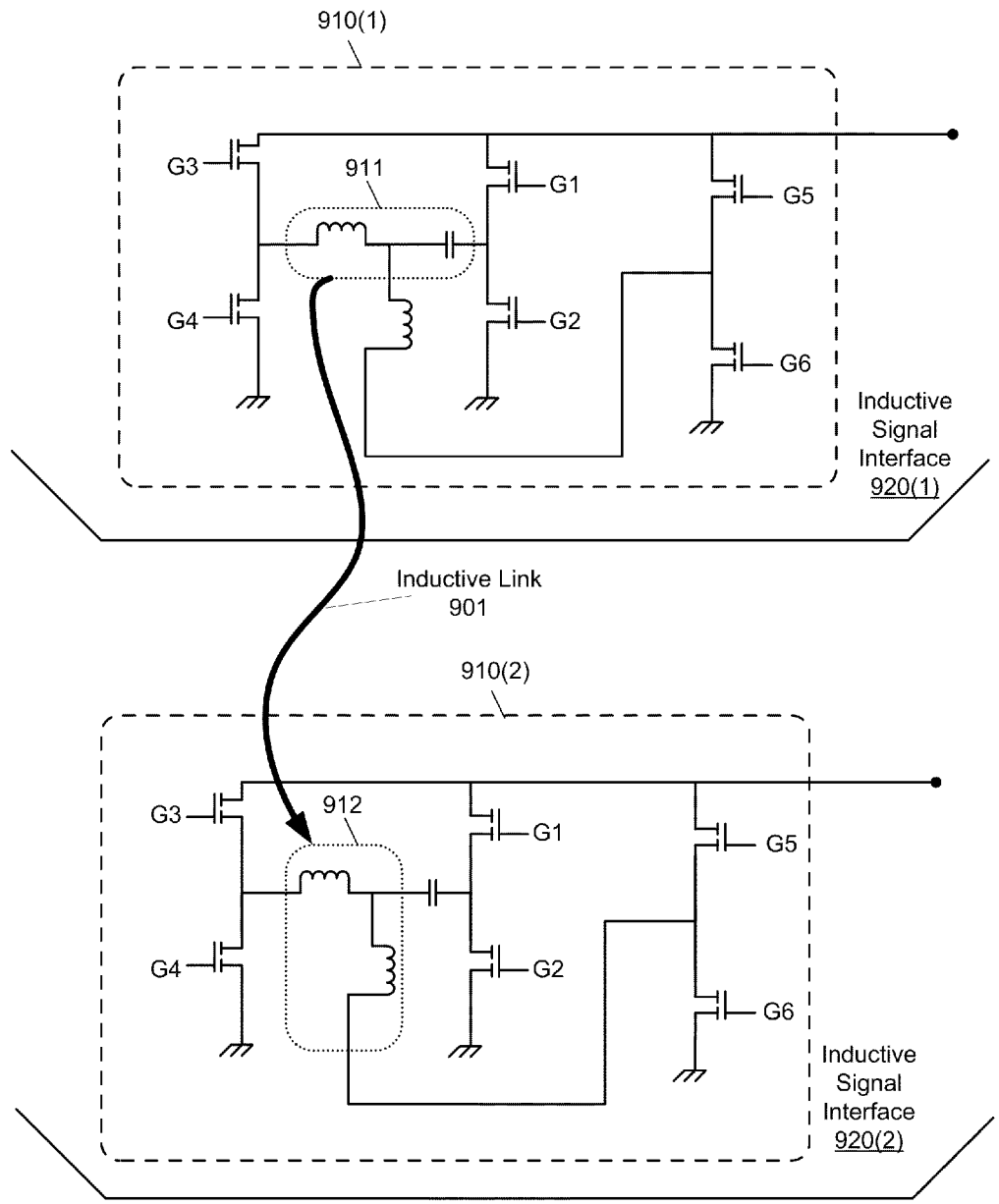
FIG. 9 illustrates the combination two similarly structured computing devices, each using a "3-legged" power bridge circuit, according to one or more embodiments.

FIG. 9 illustrates the combination two similarly structured computing devices, each using a "3-legged" power bridge circuit in accordance with any of the embodiments described herein. As mentioned, one benefit provided with use of the "3-legged" power bridge circuit is that devices of different types (e.g. mobile computing devices and docking stations) can be configured with the same power bridge circuit, to facilitate device manufacturing and optionally extend the inductive use of a device (e.g. enable mobile computing device to both receive and transmit power inductively). With reference to FIG. 9, two devices are inductively linked that each include a power bridge circuit and a bi-directional coil assembly in accordance with embodiments described herein. A first power bridge circuit and a first bi-directional coil assembly, together 910(1), reside in a first inductive signal interface 920(1) configured to operate in the power transmit mode. A second power bridge circuit and a second bi-directional coil assembly, together 910(2), reside in a second inductive signal interface 920(2) configure to operate in the power receive mode. The first inductive signal interface 920 (1) transmits power through the inductive link 901. During the operation of the inductive signal interfaces 920(1) and 920(2), a portion of the bi-directional coil assembly 911 on the first inductive signal interface 920(1) forms the inductive link 901 with a portion of the bi-directional coil assembly 912 on the second inductive signal interface 920(2) to transfer power. As illustrated by FIG. 9, the same circuit structure may be used in both an inductive power transmitter (i.e. inductive signal interface 920(1)) and an inductive power receiver (i.e. inductive signal interface 920(2)).

Figure 10:
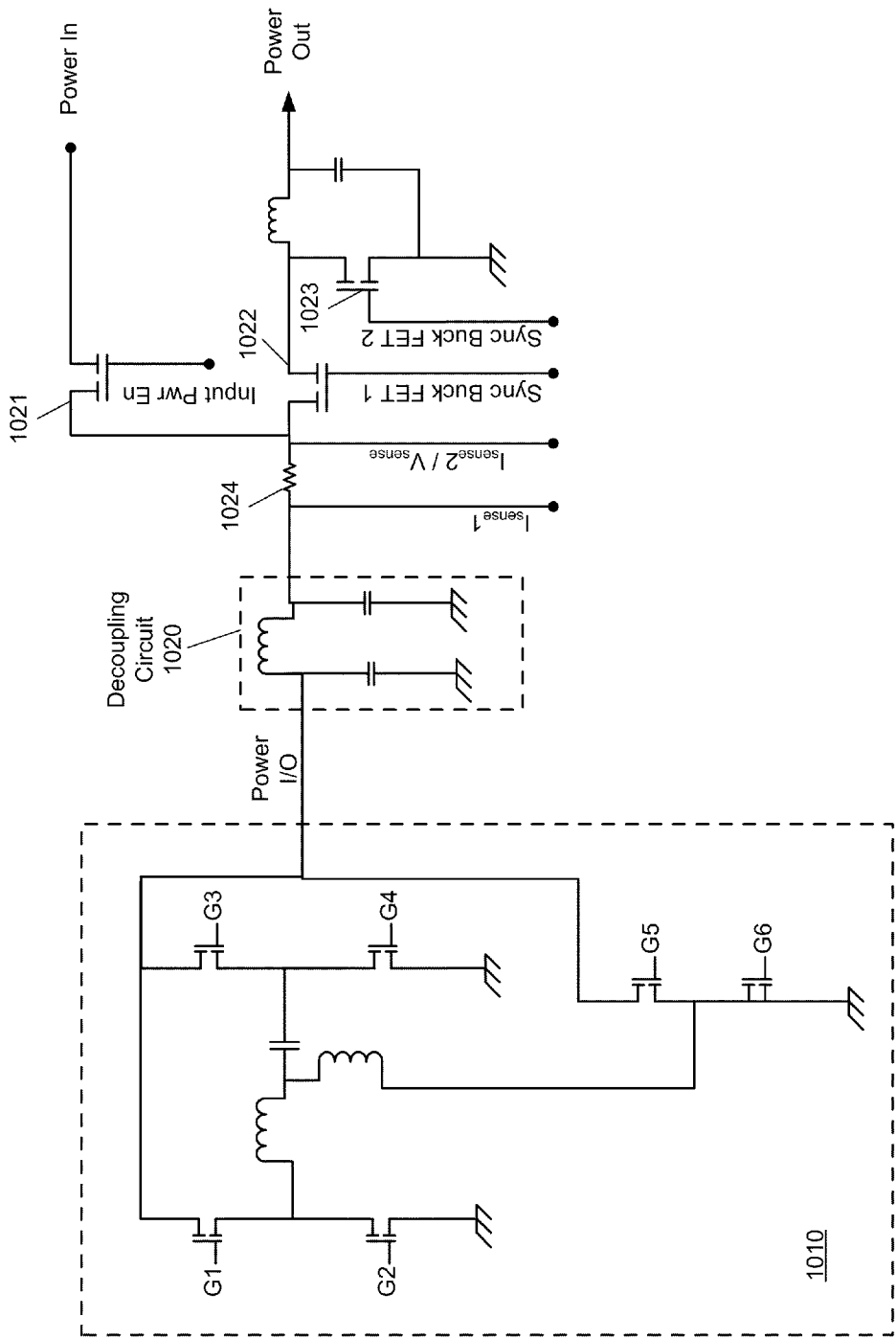
FIG. 10 illustrates a power bridge circuit and a bi-directional coil assembly coupled to current conditioning circuitry, according to another embodiment.

FIG. 10 illustrates a power bridge circuit and a bi-directional coil assembly, together 1010, coupled to current conditioning circuitry, under an embodiment. The power bridge circuit and bi-directional coil assembly combination 1010, which may be any of the above described embodiments, is coupled via a signal line Power I/O to a decoupling circuit 1020. The decoupling circuit 1020 operates to act as a filter for certain signal frequencies and prevents those signals from passing through. The decoupling circuit 1020 is coupled to a resistor 1024. Probe nodes $I_{sense}1$ and $I_{sense2}/V_{sense}$ are coupled to the resistor 1024 as illustrated. The probe nodes $I_{sense}1$ and $I_{sense2}/V_{sense}$ are used to measure the current and voltage of the signal carried by the resistor 1024. The measured current and voltage may be used to adjust the operation of the power bridge circuit and bi-directional coil assembly combination 1010. A switch 1021 is coupled to the resistor 1024 at the node $I_{sense2}/V_{sense}$ and is controlled by a signal Input Pwr En. The switch 1021 operates to couple a power signal line Power In to the resistor 1024 in order to deliver power to the power bridge circuit and bi-directional coil assembly combination 1010. Two transistors 1022 and 1023 are coupled as illustrated to act as a voltage and current regulator for outgoing current from the power bridge circuit and bi-directional coil assembly combination 1010. The transistors 1022 and 1023 are controlled by signals Sync Buck FET 1 and Sync Buck FET 2, respectively.

Figure 11:
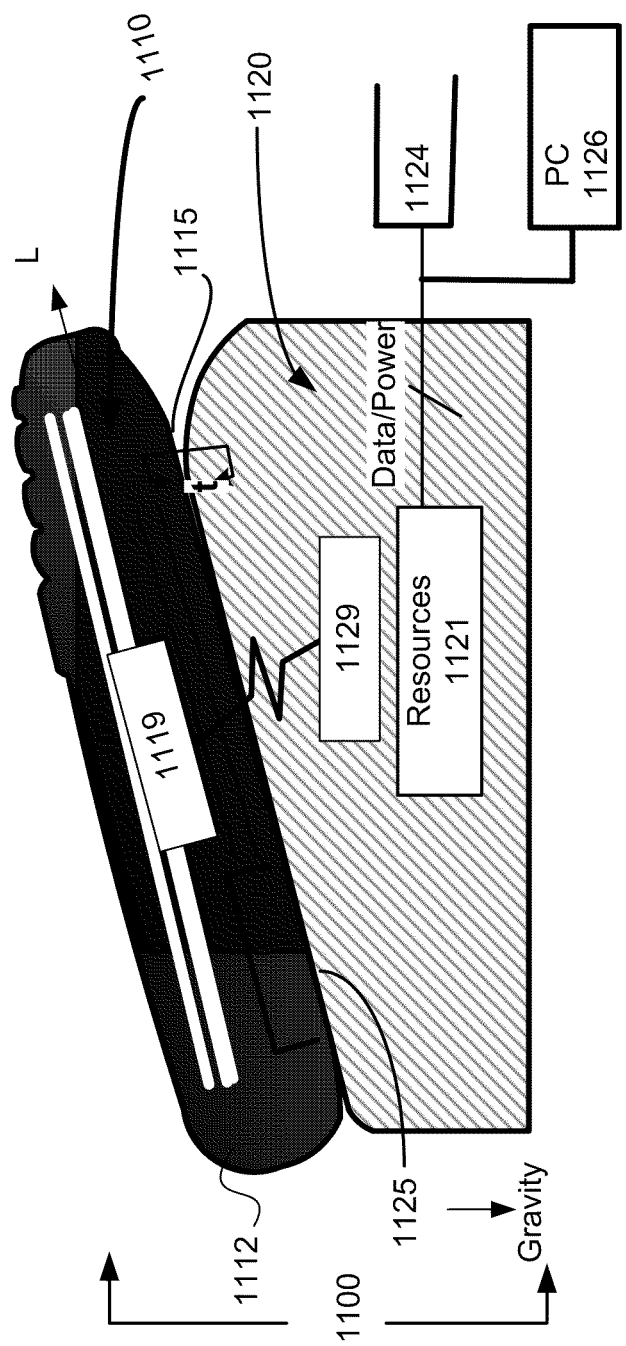
FIG. 11 is a representative diagram illustrating two computing devices that can be brought into contact for purpose of enabling one device to provide a power and/or data signal to the other device, according to one or more embodiments.

FIG. 11 is a representative diagram illustrating two computing devices that can be brought into contact for purpose of enabling one device to provide a power and/or data signal to the other device, according to an embodiment. Numerous embodiments described herein may be implemented using a mobile computing device and dock as two devices that are brought into contact with one another for purpose of power/data transfer without use of traditional insertive or mechanically coupled connectors. However, different kinds of devices (e.g. portable devices and accessory devices) may be used with embodiments described herein. In many of the examples provided herein, two devices that are inductively coupled correspond to a mobile computing device (also referred to as an "MCD") and an accessory device (specifically a dock or docking station). However, embodiments may also be implemented using other types of devices. In one implementation, the MCD is a mufti-purpose device having cellular data and telephonic capabilities, while the accessory device corresponds to, for example, a docking station (for communications and power supply), sticky (or piggy)-back accessory, a light projector, a speaker set, or headset station. As an addition or alternative to cellular telephony/data capabilities, the MCD may include, for example, functionality for use as a media player, a camera or video recorder, a global positioning unit, an ultramobile personal computer, a laptop computer, or a multi-purpose computing device. Numerous other examples and implementations are described herein, including embodiments in which three or more devices are interconnected through one or more connector-less connections.

Accordingly, a system 1100 includes a MCD 1110 that is supported or otherwise retained by a dock 1120. The manner in which the MCD 1110 is supported may vary. Moreover, as described with one or more embodiments, the orientation of the MCD on the dock may be changed by the user for purpose of configuring operations or behavior of one or both devices. According to an orientation of an embodiment shown, the MCD 1110 is supported on the dock 1120 in a partially upright position along its length axis (L). Such an orientation may correspond to a 'portrait' position. In an embodiment in which alternative orientations are possible, one or more 'landscape' positions, or positions in between the portrait and landscape positions may be possible.

According to an embodiment, the dock 1120 utilizes physical support structures (not shown), such as shelves, platforms, hooks or mechanical retention features, to retain the MCD 1110 in a docked or mated position. In another embodiment, magnetic clasps may be included or provided the dock 1120 and/or the MCD 1110 to secure retention of the MCD against the dock. Priority U.S. patent application Ser. No. 12/239,656, which is incorporated by reference herein in its entirety, details the use of magnetic clasps and ferrous (or other) material in order to physically retain the MCD 1110 in a docked position with the dock 1120.

The dock 1120 may include resources 1121 for generating or extending power and/or data signals to the MCD 1110. For example, the dock 1120 may be mated with a power outlet 1124 or another computer 1126 (e.g. desktop computer) to extend power and/or data signals. The resources 1121 may include circuitry or hardware, such as AC/DC converters and regulators. In order to enable the dock 1120 to receive electrical power from a personal computer or other computing station, one implementation provides for the dock 1120 to include a physical connector port, such as provided by a Universal Serial Bus (USB) connector. Additionally, the dock 1120 may include data acquisition capabilities, provided through connector ports with the computer 1126, wireless ports (e.g. cellular, WiMax connection, Bluetooth), Internet ports, and media feeds (e.g. provided through television tuner and cable).

As shown by an embodiment of FIG. 11, the MCD 1110 has a housing shell 1112 having a thickness (t). The housing shell 1112 may be used to retain internal components of the MCD 1110, such as a circuit board, processor, memory, or components of a display assembly. The MCD 1110 may be structured so that a primary facade 1115 (e.g. the back panel) of the housing shell 1112 rests on a receiving surface 1125 of the dock 1120.

As described throughout this application, the two computing devices are each provided an inductive signal interface 1119, 1129 for enabling one device to inductively transmit power to the other device. In accordance with embodiments described herein, the inductive signal interface 1119, 1129 of each device may be implemented using a "three-legged" power bridge circuit such as described with FIG. 6A through 6D and elsewhere in this application. In this manner, embodiments described herein provide a system and technique for delivering electrical power from over short distances without the use of electrical conductors While an embodiment described with FIG. 11 depicts two computing devices that use the "three-legged" power bridge circuit to inductively couple and signal power, other embodiments provide for use of other computing devices and device pairings. For example, the two inductively paired devices may correspond to a mobile computing device and headset, two mobile computing devices, or mobile computing device and power-resourced holster.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. An inductive signal interface comprising:
a coil assembly comprising one or more inductive coils; and
a bridge circuit that extends between the coil assembly and a power input/output (I/O), the bridge circuit to enable the inductive signal interface to selectively operate in either a power transmit mode or in a power receive mode.

2. The inductive signal interface of claim 1, wherein the bridge circuit includes three branches, the three branches including a shared branch that is operative in both the power transmit mode and the power receive mode, each branch comprising an arrangement of switches that alternatively route current (i) to the shared current branch from the power I/O to transmit power, and (ii) from the shared current branch to the power I/O to receive power, to coincide with the inductive signal interface operating in the power transmit mode and in the power receive mode.

3. The inductive signal interface of claim 2, wherein two of the three branches operate to form an H-bridge circuit while the inductive signal interface operates in the power transmit mode.

4. The inductive signal interface of claim 2, wherein two of the three branches operate to form a synchronous bridge rectifier circuit while the inductive signal interface operates in the power receive mode.

5. The inductive signal interface of claim 1, wherein the bridge circuit is to receive a direct current from a supply voltage and to transmit a high-current to the coil assembly in the power transmit mode.

6. The inductive signal interface of claim 1, wherein the bridge circuit is to receive an alternating current from the coil assembly and to output a direct current in the power receive mode.

7. The inductive signal interface of claim 1, wherein the bridge circuit is to receive a plurality of switch control signals from a control circuit that enables the inductive signal interface to selectively operate in either the power transmit mode or in the power receive mode.

8. The inductive signal interface of claim 1, wherein the coil assembly includes a capacitor.

9. The inductive signal interface of claim 8, wherein the bridge circuit is to route current (i) to the coil assembly through a series combination of the capacitor and one of the one or more inductive coils during the power transmit mode and (ii) from the coil through at least one inductive coil during the power receive mode.

10. The inductive signal interface of claim 1, wherein the inductive signal interface is to transmit and receive data inductively.

11. The inductive signal interface of claim 10, further comprising a modulator and a demodulator to facilitate the transmission and reception of data.

12. The inductive signal interface of claim 10, further comprising a communication coil for transmitting and receiving the data inductively.

13. The inductive signal interface of claim 10, wherein the coil assembly is to inductively transmit and receive data.

14. A mobile computing device comprising:
an inductive signal interface;
a coil assembly comprising one or more inductive coils; and
a bridge circuit that extends between the coil assembly and a power input/output (I/O), the bridge circuit to enable the inductive signal interface to operate in both a power transmit mode and in a power receive mode.

15. A computing assembly comprising:
a first computing device;
a second computing device;
wherein each of the first and second computing devices include an inductive signal interface to enable the first and second computing devices to inductively transfer power;
wherein the inductive signal interface of each of the first and second computing devices comprises:
  a coil assembly comprising one or more inductive coils; and
  a bridge circuit that extends between the coil assembly and a power input/output (I/O), the bridge circuit to enable the inductive signal interface to operate in both a power transmit mode and in a power receive mode.

16. The computing assembly of claim 15, wherein the bridge circuit of each of the first and second computing devices includes three branches, the three branches including a shared branch that is operative in both the power transmit mode and the power receive mode, each branch comprising an arrangement of switches that alternatively route current (i) to the shared current branch from the power I/O to transmit power, and (ii) from the shared current branch to the power I/O to receive power, to coincide with the inductive signal interface operating in the power transmit mode and in the power receive mode.

17. The computing assembly of claim 16, wherein two of the three branches of the power bridge circuit of the first computing device operate to form an H-bridge circuit, and wherein the inductive signal interface of the first computing device operates in the power transmit mode.

18. The computing assembly of claim 17, wherein two of the three branches of the power bridge circuit of the second computing device operate to form a synchronous bridge rectifier circuit, and wherein the inductive signal interface of the second computing device operates in the power receive mode.

19. The computing assembly of claim 18, wherein the first computing device is a docking station and the second computing device is a mobile computing device.

20. The computing assembly of claim 15, wherein the first computing device inductively transmits power to the second computing device.

* * * * *